US011458836B2

(12) United States Patent
Imamura et al.

(10) Patent No.: US 11,458,836 B2
(45) Date of Patent: Oct. 4, 2022

(54) VEHICLE SYSTEM

(71) Applicant: MAZDA MOTOR CORPORATION, Hiroshima (JP)

(72) Inventors: Yasumasa Imamura, Hiroshima (JP); Naoki Nobutani, Aki-gun (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 386 days.

(21) Appl. No.: 16/752,449

(22) Filed: Jan. 24, 2020

(65) Prior Publication Data
US 2020/0238823 A1 Jul. 30, 2020

(30) Foreign Application Priority Data

Jan. 30, 2019 (JP) .............................. JP2019-014138

(51) Int. Cl.
*B60K 17/35* (2006.01)
*B60W 40/13* (2012.01)
*B60W 10/02* (2006.01)

(52) U.S. Cl.
CPC ......... *B60K 17/3505* (2013.01); *B60W 10/02* (2013.01); *B60W 2040/1338* (2013.01)

(58) Field of Classification Search
CPC .............. B60K 17/3505; B60W 10/02; B60W 2040/1338
See application file for complete search history.

(56) References Cited

U.S. PATENT DOCUMENTS

| 2015/0032333 A1* | 1/2015 | Nakatsu ............... | B60W 10/22 701/37 |
| 2016/0023654 A1* | 1/2016 | Yamashita ...... | B60W 30/18145 701/69 |
| 2017/0305416 A1* | 10/2017 | Yamakado ...... | B60W 30/18109 |

FOREIGN PATENT DOCUMENTS

| DE | 102009029459 A1 * | 3/2011 | ............. B60K 6/442 |
| DE | 102015008970 A1 * | 1/2016 | ............ B60W 10/04 |
| EP | 1188597 A2 * | 3/2002 | ......... B60K 17/3505 |
| JP | 1109122 A * | 4/1989 | ............. B60K 17/35 |
| JP | 2016-002991 A | 1/2016 | |

* cited by examiner

*Primary Examiner* — Tisha D Lewis
(74) *Attorney, Agent, or Firm* — Studebaker & Brackett PC

(57) ABSTRACT

A vehicle system includes an engine driving a vehicle, a front wheel and a rear wheel, a suspension device with an attachment portion to a vehicle body which is located at a higher level than a center axis of the rear wheel, an electromagnetic coupling to distribute a torque of the engine to the front wheel and the rear wheel, a steering wheel to be operated by a driver, a steering angle sensor to detect a steering angle corresponding to operation of the steering wheel, and a controller to control the engine and the electromagnetic coupling. The controller is configured to control the electromagnetic coupling such that the torque distributed to the rear wheel is decreased in accordance with a returning operation of the steering wheel which is detected by the steering angle sensor.

15 Claims, 14 Drawing Sheets

(Torque Increase of Rear Wheel)

(Torque Decrease of Rear Wheel)

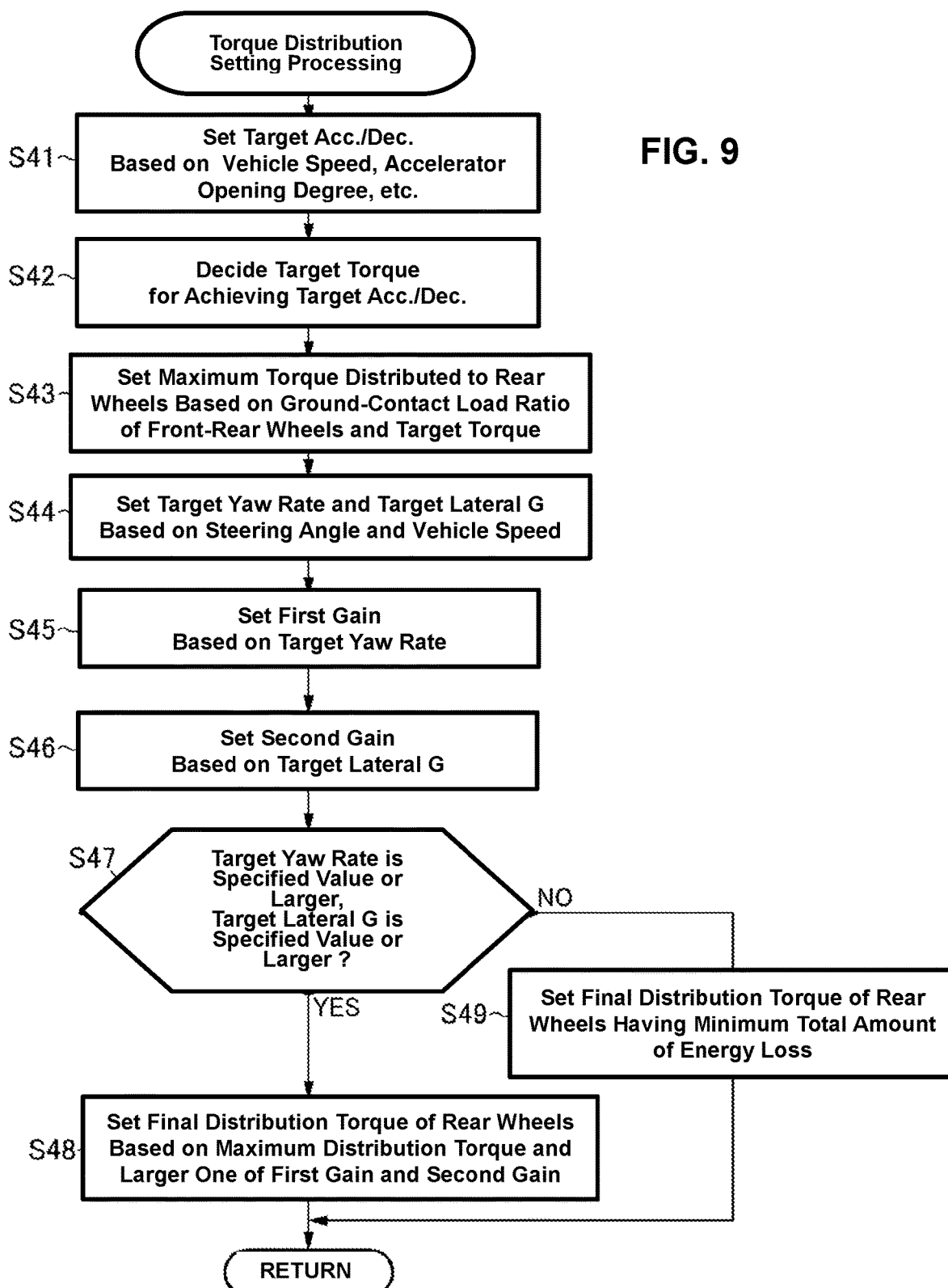

Target Yaw Rate

Target Lateral G

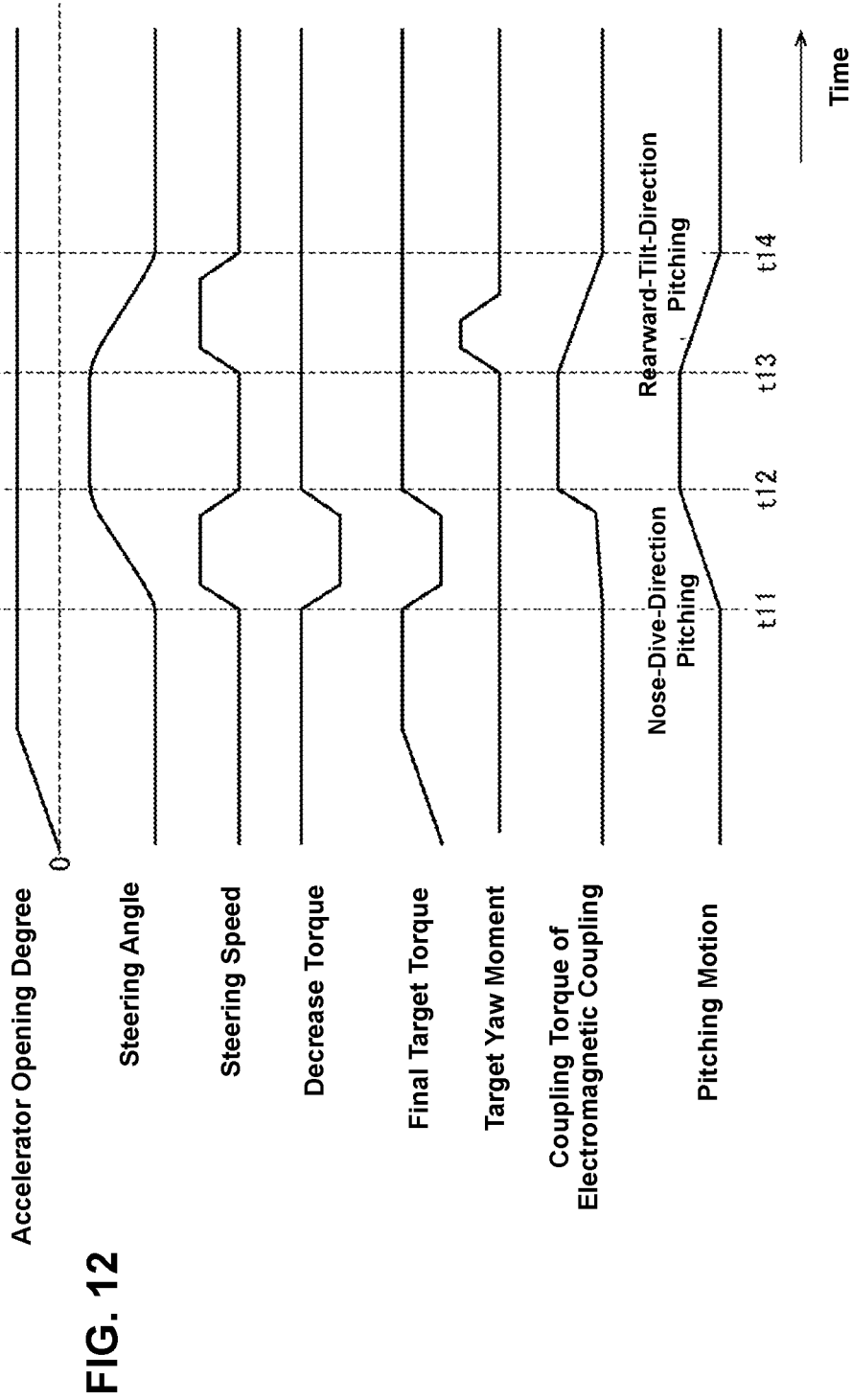

VEHICLE SYSTEM

BACKGROUND

Technical Field

The present disclosure relates to a vehicle system to control an attitude of a vehicle which is configured such that a torque of a power source is distributed to a front wheel and a rear wheel.

Background Art

Conventionally, a technology that the torque of the power source is distributed to the front wheel and the rear wheel is known in a vehicle which is configured to drive the front wheel and the rear wheel (four-wheel drive vehicle). In this technology, a torque distribution ratio of the front wheel and the rear wheel is controlled properly in accordance with a traveling state of the vehicle and the like. Japanese Patent Laid-Open Publication No. 2016-2991, for example, discloses a technology that pitching is suppressed at a generation timing of a pitching behavior by changing distribution of a drive torque applied to the front wheel and another drive torque applied to the rear wheel in accordance with a differential value of a target drive torque. In the technology disclosed in Japanese Patent Laid-Open Publication No. 2016-2991, the pitching generated in substantially-straight vehicle traveling is suppressed.

Herein, it is considered that a person (driver) recognizes a turning motion of the vehicle from a load state of the vehicle which is caused by a change of the pitching of a sprung part of the vehicle. Accordingly, it is considered that the pitching change of the vehicle which is generated when the vehicle turns has influence on an operation of a steering wheel by a driver. For example, it is considered that when the steering wheel is returned (i.e., in a vehicle turn-out operation), pitching of making the vehicle move in a rearward-tilt direction is generated, so that the driver can feel the stability. Therefore, it can be considered that it is preferable to generate the pitching of making the vehicle move in the rearward-tilt direction (i.e., the rearward-tilt-direction pitching) when the steering wheel is returned.

As described in Japanese Patent Laid-Open Publication No. 2016-2991, there exists the technology of controlling the torque distribution ratio of the front wheel and the rear wheel of the four-wheel drive vehicle for suppressing the pitching generated at the four-wheel drive vehicle. However, it has not been performed to positively control the pitching generated at the vehicle by controlling the torque distribution ratio of the front wheel and the rear wheel. For example, the control for positively generating the above-described rearward-tilt-direction pitching at the vehicle in the vehicle turning has not been performed.

SUMMARY

The present disclosure thus provides a vehicle system which can properly generate desired pitching at the vehicle by controlling the torque distribution ratio of the front wheel and the rear wheel when the steering wheel is returned.

The present disclosure is a vehicle system, comprising a power source to drive a vehicle, a front wheel and a rear wheel, a suspension device provided with an attachment portion where the suspension device is attached to a vehicle body, the attachment portion being located at a higher level than a center axis of the rear wheel, a torque distributing mechanism to distribute a torque of the power source to the front wheel and the rear wheel, a steering wheel to be operated by a driver, a steering angle sensor to detect a steering angle which corresponds to operation of the steering wheel, and a controller to control the power source and the torque distributing mechanism, wherein the controller is configured to control the torque distributing mechanism such that the torque distributed to the rear wheel is decreased in accordance with returning operation of the steering wheel which is detected by the steering angle sensor.

According to the present disclosure, the controller controls the torque distributing mechanism such that the torque distributed to the rear wheel is decreased when the steering wheel is returned, i.e., in the vehicle turn-out operation, in the vehicle (four-wheel drive) comprising the torque distributing mechanism to distribute the torque of the power source. As the torque applied to the rear wheel is decreased, a force to pull back the rear wheel rearwardly is transmitted from the rear wheel to the vehicle body through the suspension device. Herein, since the suspension device is configured to extend obliquely upwardly from the center axis of the rear wheel toward the attachment portion to the vehicle body, a downward element of the above-described force to pull back the rear wheel rearwardly is generated at the vehicle body, that is—a force to lower a rear part of the vehicle body downwardly acts on the vehicle body instantaneously. Consequently, a moment to move the vehicle body in the rearward-tilt direction (i.e., a moment to change an attitude of the vehicle body such that its rear part is lowered relative to its front part) is so generated that the rearward-tilt-direction pitching can be generated at the vehicle body. This generation of the rearward-tilt-direction pitching can have the driver feel the stability when the steering wheel is returned. Further, because of the above-described moment of generating the rearward-tilt-direction pitching of the vehicle body, a force to lift up the front part of the vehicle upwardly acts on the vehicle body, so that a front-wheel load is decreased. Thereby, the turning responsiveness of the vehicle to the returning operation of the steering wheel, i.e., the recovery performance from the vehicle turning (the recovery performance toward a straight advance direction of the vehicle) can be improved.

In an embodiment of the present disclosure, a brake device is provided at each of the front wheel and the rear wheel, and the controller is configured to control the brake device which is provided at a turning outer wheel such that a yaw moment which has an opposite direction to a yaw rate generated at the vehicle is applied to the vehicle when the returning operation of the steering wheel is conducted.

According to this embodiment, the controller executes the control to apply the braking force to the turning outer wheel so as to give the yaw moment which has the opposite direction to the yaw rate generated at the vehicle when the steering wheel is returned, in addition to the above-described control to decrease the torque applied to the rear wheel. Thereby, the recovery performance from the vehicle turning can be effectively improved.

In another embodiment of the present disclosure, the controller is configured to suppress the performance of the torque distributing mechanism for changing the torque distributed to the rear wheel in a steady turning state of the vehicle before the returning operation of the steering wheel.

According to this embodiment, the pitching motion of the vehicle can be stabilized in the steady turning state, thereby giving the driver the ground-contact feeling.

Other features, aspects, and advantages of the present disclosure will become apparent from the following description which refers to the accompanying drawings.

BRIEF DESCRIPTION OF THE DRAWINGS

FIG. 9 is a flowchart showing a torque-distribution setting processing according to the embodiment of the present disclosure;

FIG. 12 is a time chart showing an example in a case where a vehicle attitude control according to the embodiment of the present disclosure is executed;

DETAILED DESCRIPTION

Figure 1:
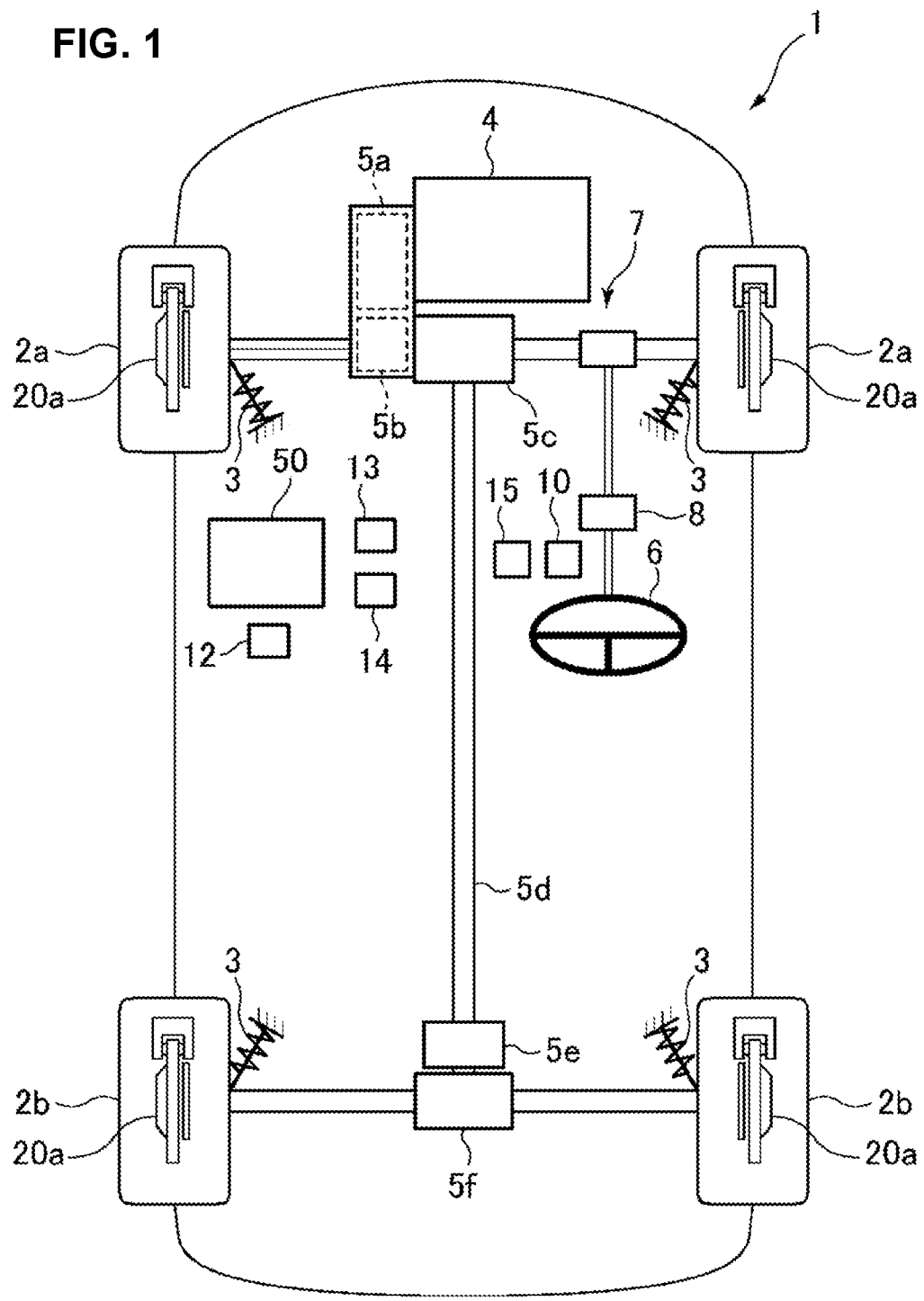
FIG. 1 is a block diagram showing a whole structure of a vehicle to which a vehicle system according to an embodiment of the present disclosure is applied.

Hereafter, a vehicle system according to an embodiment of the present disclosure will be described referring to the drawings.

<System Configuration>

First, configuration of the vehicle system according to the embodiment of the present disclosure will be described. FIG. 1 is a block diagram showing a whole structure of a vehicle to which the vehicle system according to the embodiment of the present disclosure is applied.

As shown in FIG. 1, a vehicle 1 is provided with right-and-left front wheels 2a which are disposed at a front part of a vehicle body as steered wheels and main driving wheels and right-and-left rear wheels 2b which are disposed at a rear part of the vehicle body as auxiliary driving wheels. These wheels 2a, 2b of the vehicle 1 are respectively supported by suspensions 3 at the vehicle body. Further, an engine 4 as a drive source (motor) to drive the front wheels 2a mainly is installed at the front part of the vehicle body of the vehicle 1. While the engine 4 is a gasoline engine in the present embodiment, any other type of internal combustion engine, such as a diesel engine, or a motor driven by an electric power may be used.

The vehicle 1 is a front-engine front-drive type (FF type) based four-wheel drive vehicle. Specifically, the vehicle 1 comprises a transmission 5a which transmits a torque of the engine 4 with a set gear ratio, a front differential gear 5b which transmits the torque transmitted from the transmission 5a to the right-and-left front wheels 2a respectively, a PTO (Power Take Off) 5c as a transfer which takes out the torque to be transmitted to the rear wheels 2b, a propeller shaft 5d which is coupled to the PTO 5c and extends in a vehicle longitudinal direction, an electromagnetic coupling 5e which is coupled to the propeller shaft 5d and capable of changing the torque distributed to the rear wheels 2b, and a rear differential gear 5f which transmits the torque transmitted from the electromagnetic coupling 5e to the right-and-left rear wheels 2b respectively.

Specifically, the electromagnetic coupling 5e includes a coupling device which comprises an input shaft (not illustrated) through which the torque is transmitted from a front-wheel side and an output shaft (not illustrated) through which the torque is transmitted to a rear-wheel side. The above-described input shaft is coupled to a propeller shaft 5d, and the above-described output shaft is coupled to the rear differential gear 5f. The electromagnetic coupling 5e includes an electromagnetic coil, a cam mechanism, a clutch (which are not illustrated) and so on, which constitutes a "torque distribution mechanism" of the present disclosure. The electromagnetic coupling 5e is configured to change a coupling degree (specifically, a coupling torque) of this electromagnetic coupling 5e in accordance with an electric current supplied to the electromagnetic coil provided therein. The electromagnetic coupling 5e is configured to change the torque transmitted to the rear differential gear 5f (i.e., the torque transmitted to the rear wheels 2b) from the propeller shaft 5d by changing the coupling degree as described above. That is, a torque distribution ratio which is a ratio between the torque distributed to the front wheels 2a and the torque distributed to the rear wheels 2b is changed. This changing of the torque distribution ratio is basically set such that the higher the coupling degree of the electromagnetic coupling 5e is, the larger the torque distributed to the rear wheels 2b is, and the lower the coupling degree of the electromagnetic coupling 5e is, the smaller the torque distributed to the rear wheels 2b is.

Further, a steering device 7 which includes a steering wheel 6 and others is installed at the vehicle 1, and the front wheels 2a of the vehicle 1 are configured to be steered in accordance with a rotational operation of the steering wheel 6. In addition, a brake device 20a to apply a braking force to the vehicle 1 is provided at each of the front wheels 2a and the rear wheels 2b.

Moreover, the vehicle 1 is provided with a steering angle sensor 8 to detect a steering angle of the steering device 7, an accelerator opening-degree sensor 10 to detect a pressing amount (opening degree) of an accelerator (i.e., an acceleration pedal), a vehicle speed sensor 12 to detect a vehicle speed, a yaw rate sensor 13 to detect a yaw rate, an acceleration sensor 14 to detect acceleration, and a brake pressing amount sensor 15 to detect a pressing amount of a brake pedal. While the steering angle sensor 8 typically detects a rotational angle of the steering wheel 6, a steered angle of the front wheel 2a (a tire angle) may be detected in addition to or in place of the above-described rotational angle. These sensors output respective detection signals to the controller 50.

Figure 2:
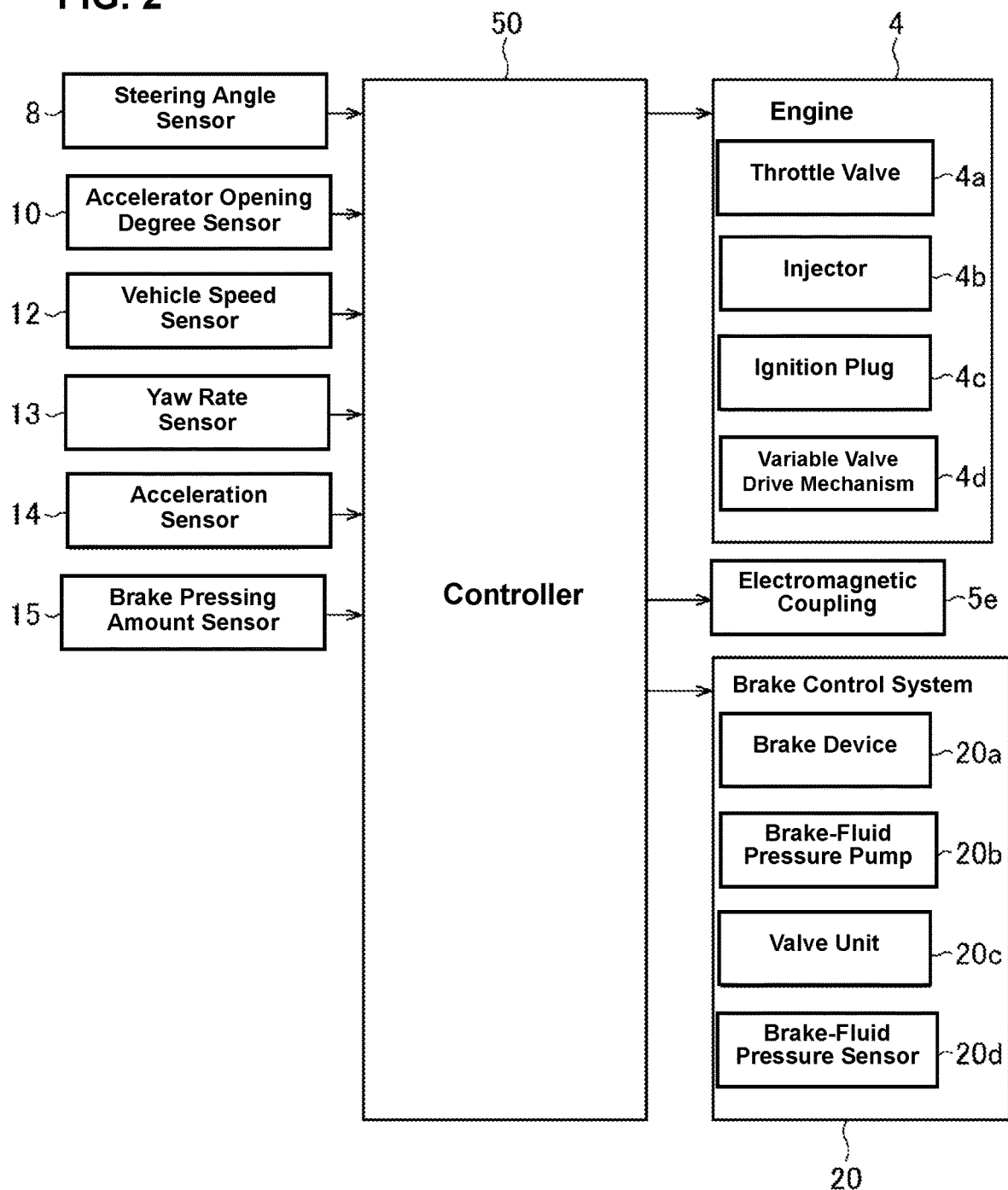
FIG. 2 is a block diagram showing an electrical configuration of the vehicle system according to the embodiment of the present disclosure.

Next, an electrical configuration of the vehicle system according to the embodiment of the present disclosure will be described referring to FIG. 2. FIG. 2 is a block diagram showing the electrical configuration of the vehicle system according to the embodiment of the present disclosure.

The controller 50 according to the present embodiment outputs control signals to control a throttle valve 4a, an injector (fuel injector) 4b, an ignition plug 4c, and a variable valve-driving mechanism (variable valve train) 4d in accordance with detection signals outputted by various sensors to detect a driving state of the engine 4 and the like, in addition to detection signals of the above-described sensors 8, 10, 12, 13, 14 and 15.

Further, the controller 50 controls a brake control system 20 which includes the above-described brake device 20a. The brake control system 20 is a system to supply a brake-fluid pressure to a wheel cylinder and a brake caliper of the brake device 20a. The brake control system 20 is provided with a brake-fluid pressure pump 20b to generate a brake-fluid pressure necessary for generating the braking force in the brake device 20a provided at each wheel. The brake-fluid pressure pump 20b is configured to be driven by an electric power supplied from a battery, for example, so as to generate the brake-fluid pressure necessary for generating the braking force in the brake device 20a even when the brake pedal is not pressed. Moreover, the brake control system 20 comprises a valve unit 20c (specifically, a solenoid valve) to control the fluid pressure which is supplied from the pressure pump 20b to the brake device 20a provided at each wheel, which is provided in a brake-fluid supply line to the brake device 20a. An opening degree of the valve unit 20c is changed by adjusting a supply amount of an electric power supplied from the battery to the valve unit 20c, for example. The brake control system 20 further comprises a brake-fluid pressure sensor 20d to detect the brake-fluid pressure which is supplied from the brake-fluid pressure pump 20b to the brake device 20a provided at each wheel. This pressure sensor 20d is arranged at a connection portion of each of the valve units 20c and a brake-fluid pressure supply line positioned on a downstream side of the valve unit 20c, for example, and detects the pressure on the downstream side of the valve unit 20c and outputs a value of its detected pressure to the controller 50. The brake control system 20 described above calculates the brake-fluid pressure independently supplied to the wheel cylinder and the brake caliper of each wheel, and controls a rotational speed of the brake-fluid pressure pump 20b and the opening degree of the valve unit 20c in accordance with the calculated brake-fluid pressure.

The controller 50 is provided with PCM (Power-train Control Module), not illustrated, and others. The controller 50 is made of a computer which comprises one or more processors, various kinds of program (including a basic control program, such as OS, application programs executed on the OS program so as to perform specific functions) executed by the processor(s), and internal memories, such as ROM and RAM which memorize the programs and various kinds of data.

The controller 50 performs a control for the electromagnetic coupling 5e as well. Specifically, the controller 50 adjusts an applied electric current to be supplied to the electromagnetic coupling 5e, thereby controlling the torque distribution ratio of the front wheels 2a and the rear wheels 2b.

Figure 3:
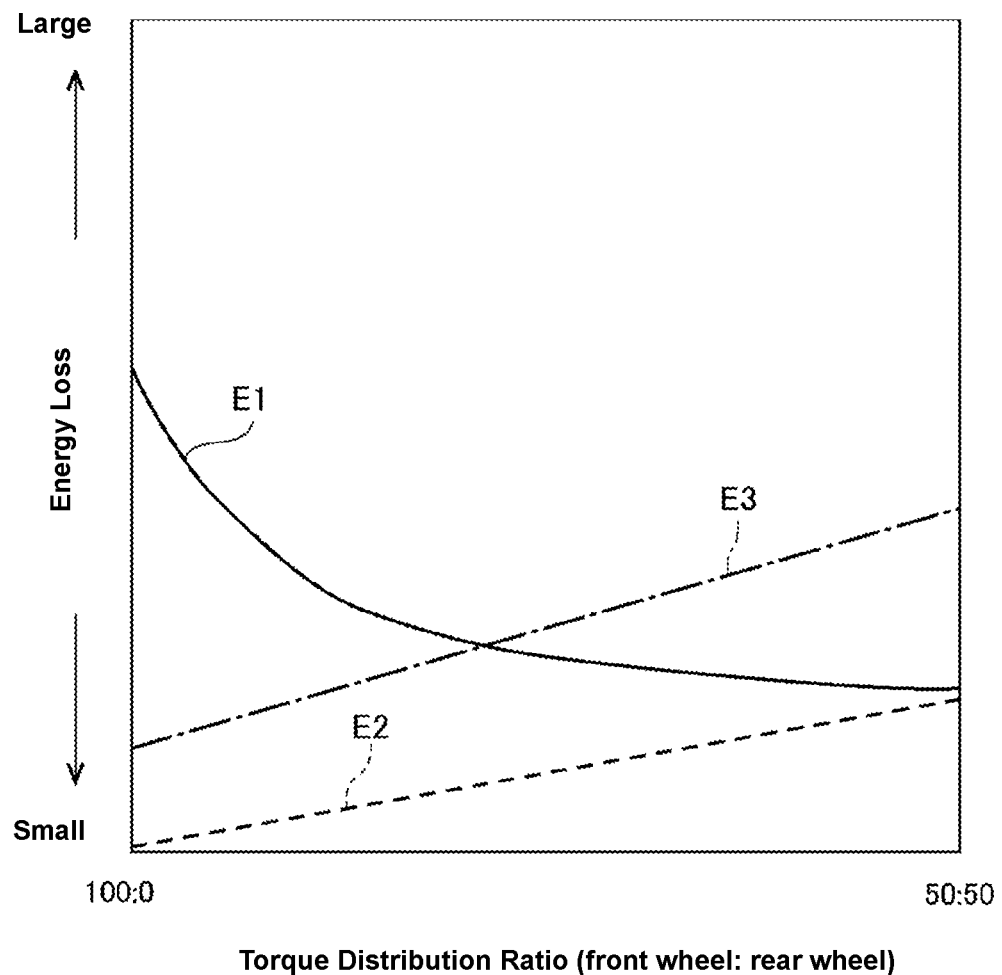
FIG. 3 is an explanatory graph showing a basic setting method of a torque distribution ratio according to the embodiment of the present disclosure.

Herein, a basic method of setting the torque distribution ratio in the embodiment of the present disclosure will be described referring to FIG. 3. FIG. 3 shows the torque distribution ratio (specifically, the torque distributed to the front wheels 2a: the torque distributed to the rear wheels 2b) at a lateral axis and an energy loss at a vertical axis. Specifically, a graph E1 shows the energy loss caused by slip of the front wheels (main driving wheels) 2a relative to torque distribution ratio, a graph E2 shows the energy loss caused by slip of the rear wheels (auxiliary driving wheels) 2b relative to torque distribution ratio, and a graph E3 shows the energy loss corresponding to a mechanical loss caused by a torque transmitting mechanism (such as the propeller shaft 5d, the electromagnetic coupling 5e, and the rear differential gear 5f) to the rear wheels (auxiliary driving wheels) 2b relative to torque distribution ratio.

As shown in the graph E1, the energy loss caused by the slip of the front wheels 2a decreases as the torque distribution ratio goes to the right, i.e., the amount of the torque distribution of the rear wheels 2b becomes larger. Meanwhile, as shown in the graph E2, the energy loss caused by the slip of the rear wheels 2b increases as the amount of the torque distribution of the rear wheels 2b becomes larger, and as shown in the graph E3, the energy loss corresponding to the mechanical loss caused by the power transmission to the rear wheels 2b increases as the amount of the torque distribution of the rear wheels 2b becomes larger. In the present embodiment, the controller 50 basically obtains a total amount of the three energy losses E1, E2, E3 and determines the torque distribution ratio to minimize this total amount of the energy losses. Then, the controller 50 controls the applied electric current supplied to the electromagnetic coupling 5e so that the above-described determined torque distribution ratio can be actually achieved.

Herein, the vehicle system of the present disclosure is mainly configured by the engine 4 as a power source, the front wheels 2a and the rear wheels 2b, the suspension 3 as a suspension device, the electromagnetic coupling 5e as a torque distribution ratio, the steering wheel 6, the steering angle sensor 8, and the controller 50 as a controller.

<Control Contents>

Next, control contents executed by the controller 50 according to the present embodiment will be described.

Figure 4A:
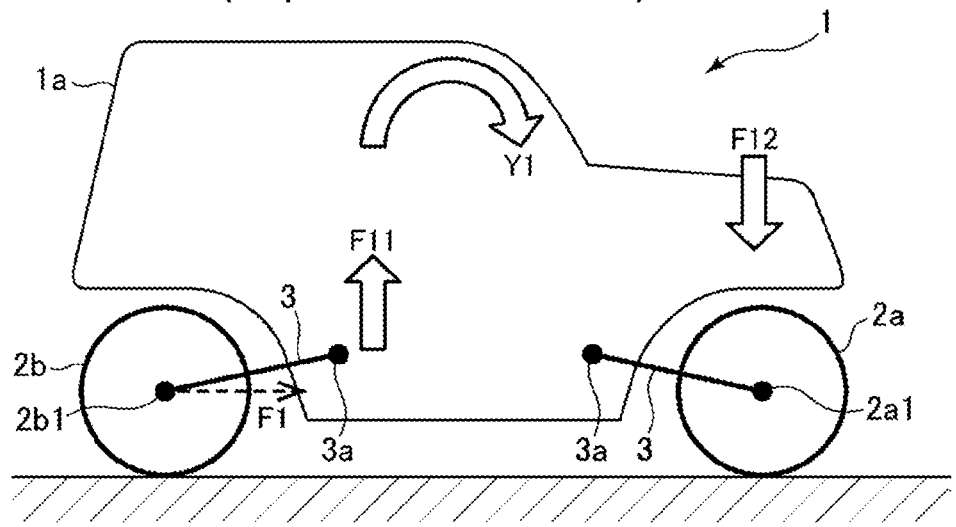
FIGS. 4A and 4B are explanatory diagrams showing respective pitching which are generated at the vehicle when a distribution torque of a rear wheel is increased and decreased, respectively.
Figure 4B:
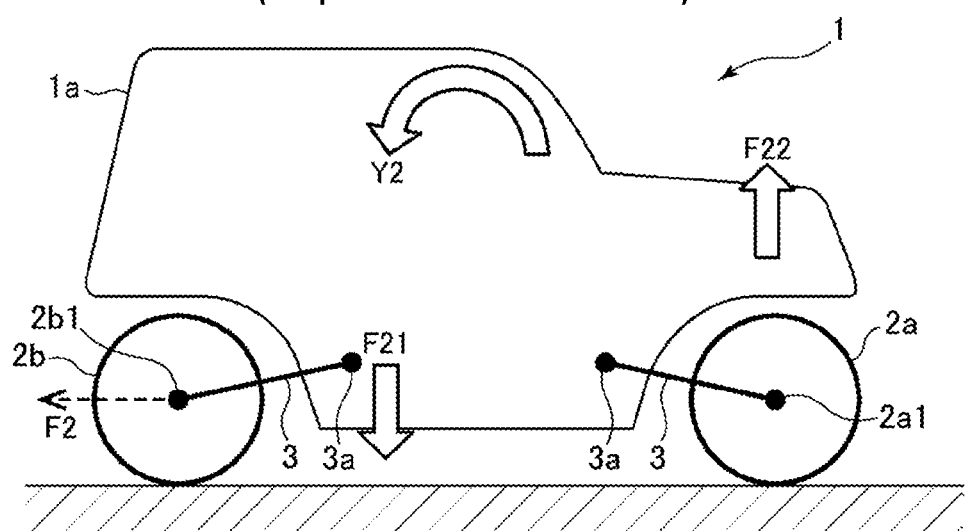

First, an outline of the control contents of the present embodiment will be described referring to FIGS. 4A and 4B. FIG. 4A is an explanatory diagram showing pitching which is generated at the vehicle 1 when the electromagnetic coupling 5e is controlled such that the torque distributed to the rear wheels 2b is increased, and FIG. 4B is an explanatory diagram showing pitching which is generated at the vehicle 1 when the electromagnetic coupling 5e is controlled such that the torque distributed to the rear wheels 2b is decreased. As shown in FIGS. 4A and 4B, a vehicle body 1a of the vehicle 1 is suspended by the suspensions 3 between the front wheels 2a and the rear wheels 2b, and the suspensions 3 are provided with attachment portions 3a where the suspensions 3 are attached to the vehicle body 1a. Herein, the attachment portion 3a is located at a higher level than a center axis 2b1 of the rear wheel 2b (likewise, a center axis 2a1 of the front wheel 2a).

In the present embodiment, as shown in FIG. 4A, the controller 50 performs the control to make the coupling degree of the electromagnetic coupling 5e high in accordance with the turning operation of the steering wheel 6 which is detected by the steering angle sensor 8. That is, the controller 50 controls the electromagnetic coupling 5e so as to increase the torque distributed to the rear wheels 2b in the vehicle turn-in operation (i.e., when the steering wheel 6 is turned).

As the torque distributed to the rear wheels 2b is increased as described above, a force F1 to drive the rear wheel 2b forwardly is transmitted from the rear wheel 2b to the vehicle body 1a through the suspension 3. Herein, since the suspension 3 is configured to extend obliquely upwardly from the center axis 2b1 of the rear wheel 2b toward the attachment portion 3a to the vehicle body 1a, an upward element F11 of the above-described force F1 to drive the rear wheel 2b forwardly is generated at the vehicle body 1a, that is—a force to lift up a rear part of the vehicle body 1a upwardly acts on the vehicle body 1a instantaneously. Consequently, a moment Y1 shown in FIG. 4A is generated, so that the above-described nose-dive-direction pitching is generated at the vehicle body 1a. This generation of the nose-dive-direction pitching can have the driver feel the responsiveness to the diver's operation for the vehicle turn-in operation when the steering wheel 6 is turned.

Further, because of the above-described moment Y1 of generating the nose-dive-direction pitching of the vehicle body 1a, a force F12 to lower the front part of the vehicle body 1a downwardly acts on the vehicle body 1a, so that a front-wheel load is increased. Thereby, the turning responsiveness of the vehicle 1 can be improved as well. Herein, while it is considered that when the torque applied to the rear wheel 2b is increased as described above, an inertia force to tilt the vehicle body 1a rearwardly is generated in addition to the above-described instantaneous force to cause the nose-dive-direction pitching of the vehicle body 1a, the instantaneous force to cause the nose-dive-direction pitching of the vehicle body 1a is dominant in contribution to the above-described responsiveness to the diver's operation when the steering wheel 6 is turned.

In the present embodiment, the controller 50 executes only the above-described control to increase the torque distributed to the rear wheels 2b for generating the nose-dive-direction pitching at the vehicle body 1a (hereafter, referred to as a "first vehicle attitude control") in a case where the torque of the engine 4 is lower than a specified value (typically, the accelerator is OFF) when the steering wheel 6 is turned. Meanwhile, in a case where the torque of the engine 4 is the specified value or larger (typically, the accelerator is ON) even when the steering wheel 6 is turned, the controller 50 executes a control to set a decrease torque of the engine 4 in accordance with the turning operation of the steering wheel 6 and then decrease the torque generated by the engine 4 by this decrease torque (hereafter, referred to as a "second vehicle attitude control"), without executing the above-described first vehicle attitude control. According to this second vehicle attitude control, since deceleration is generated at the vehicle 1 by the torque decrease, the front-wheel load is increased, so that the turning responsiveness of the vehicle 1 when the steering wheel 6 is turned can be improved.

As described above, according to the present embodiment, since the controller 50 is not able to properly decrease the torque of the engine 4 based on the decrease torque in the case where the torque of the engine 4 is lower than the specified value when the steering wheel 6 is turned, the controller 50 executes the control to increase the torque distributed to the rear wheels 2b (the first vehicle attitude control) by means the electromagnetic coupling 5e, thereby achieving the desired vehicle attitude (the nose-dive-direction pitching). Meanwhile, since the controller 50 is able to properly decrease the torque of the engine 4 in the case where the torque of the engine 4 is the specified value or larger when the steering wheel 6 is turned, the controller 50 executes the control to decrease the torque of the engine 4 in accordance with the turning operation of the steering wheel 6 (the second vehicle attitude control), suppressing its executing the first vehicle attitude control. In this case, the controller 50 restricts changing of the torque distribution ratio by means of the electromagnetic coupling 5e in the first vehicle attitude control (for example, limits an increase rate of the torque distributed to the rear wheels 2b). This is because if the first vehicle attitude control is executed while the second vehicle attitude control is executed, the desired pitching cannot be generated properly.

The reason why the torque of the rear wheels 2b can be increased by the first wheel attitude control in the case where the torque of the engine 4 is lower than the specified value, that is—the reason why the torque of the rear wheels 2b can be increased in spite of little generation of the torque of the engine 4 is as follows. The electromagnetic coupling 5e is configured such that in the case where the torque of the engine 4 is lower than the specified value (typically, in the accelerator OFF), the rotational speed of the output shat transmitting the torque to the rear-wheel side is lower than that of the input shaft through which the torque is transmitted from the front-wheel side. In other words, the rotational speed of the input shaft of the rear differential gear 5f which is located on an output side (rear-wheel side) of the electromagnetic coupling 5e is lower than that of the propeller shaft 5d which is located on an input side (front-wheel side) of the electromagnetic coupling 5e because of setting of the gear ratio of the PTO 5c and the rear differential gear 5f. If the coupling degree (coupling torque) of the electromagnetic coupling 5e is made high in accordance with the turning operation of the steering wheel 6 as described above under this situation, the rotational speed of the output shaft of the electromagnetic coupling 5e increases, specifically, the rotational speed of the output shaft of the electromagnetic coupling 5e increases by a decreased speed of the rotational speed of the input shaft of the electromagnetic coupling 5e, so that the torque applied to the rear wheels 2b increases instantaneously.

Further, in the present embodiment, as shown in FIG. 4B, the controller 50 executes a control to make the coupling degree of the electromagnetic coupling 5e low in accordance with a returning operation of the steering wheel 6 which is detected by the steering angle sensor 8. That is, the controller 50 controls the electromagnetic coupling 5e such that the torque distributed to the rear wheels 2b is decreased in a vehicle turn-out operation (i.e., the steering wheel 6 is returned).

If the torque distributed to the rear wheels 2b is decreased as described above, a force F2 to pull back the rear wheels 2b rearwardly is transmitted from the rear wheels 2b to the vehicle body 1a through the suspension 3. In this case, since the suspension 3 is configured to extend obliquely downwardly from the attachment portion 3a to the vehicle body 1a toward the center axis 2b1 of the rear wheel 2b, a downward element F21 of the above-described force F2 to pull back the rear wheel 2b rearwardly is generated at the vehicle body 1a, that is—the force F21 to lower the rear part of the vehicle body 1a downwardly acts on the vehicle body 1a instantaneously. Consequently, a moment Y2 shown in FIG. 4B is generated, so that a rearward-tilt-direction pitching is generated at the vehicle body 1a. This generation of the rearward-tilt-direction pitching can have the driver feel the stability.

Further, because of the above-described moment Y2 of generating the rearward-tilt-direction pitching of the vehicle body 1a, a force F22 to lift up the front part of the vehicle body 1a upwardly acts on the vehicle body 1a, so that the front-wheel load is decreased. Thereby, the vehicle responsiveness to the returning operation of the steering wheel 6, i.e., the recovery performance from the vehicle turning (the recovery performance toward a straight advance direction of the vehicle 1) can be improved. Hereafter, the control to generate the rearward-tilt-direction pitching at the vehicle body 1a by decreasing the torque distributed to the rear wheels 2b when the steering wheel 6 is returned will be referred to as a "third vehicle attitude control." Herein, while it is considered that when the torque applied to the rear wheels 2b is decreased as described above, an inertia force to tilt the vehicle body 1a forwardly is generated in addition to the above-described instantaneous force to cause the rearward-tilt-direction pitching of the vehicle body 1a, the instantaneous force to cause the rearward-tilt-direction pitching of the vehicle body 1a is dominant in contribution to the above-described responsiveness to the diver's operation when the steering wheel 6 is returned.

Further, in the present embodiment, the controller 50 executes a control of the brake device 20a for applying the braking force to the turning outer wheels so that a yaw moment which has an opposite (reverse) direction to the yaw rate generated at the vehicle 1 is applied to the vehicle 1 (hereafter, referred to as a "four vehicle attitude control"), in addition to the control to decrease the torque distributed to the rear wheels 2b when the steering wheel 6 is returned, i.e., the returning operation of the steering wheel 6 is conducted (the third vehicle attitude control). Thereby, the recovery performance from the vehicle turning can be improved more effectively.

Figure 5:
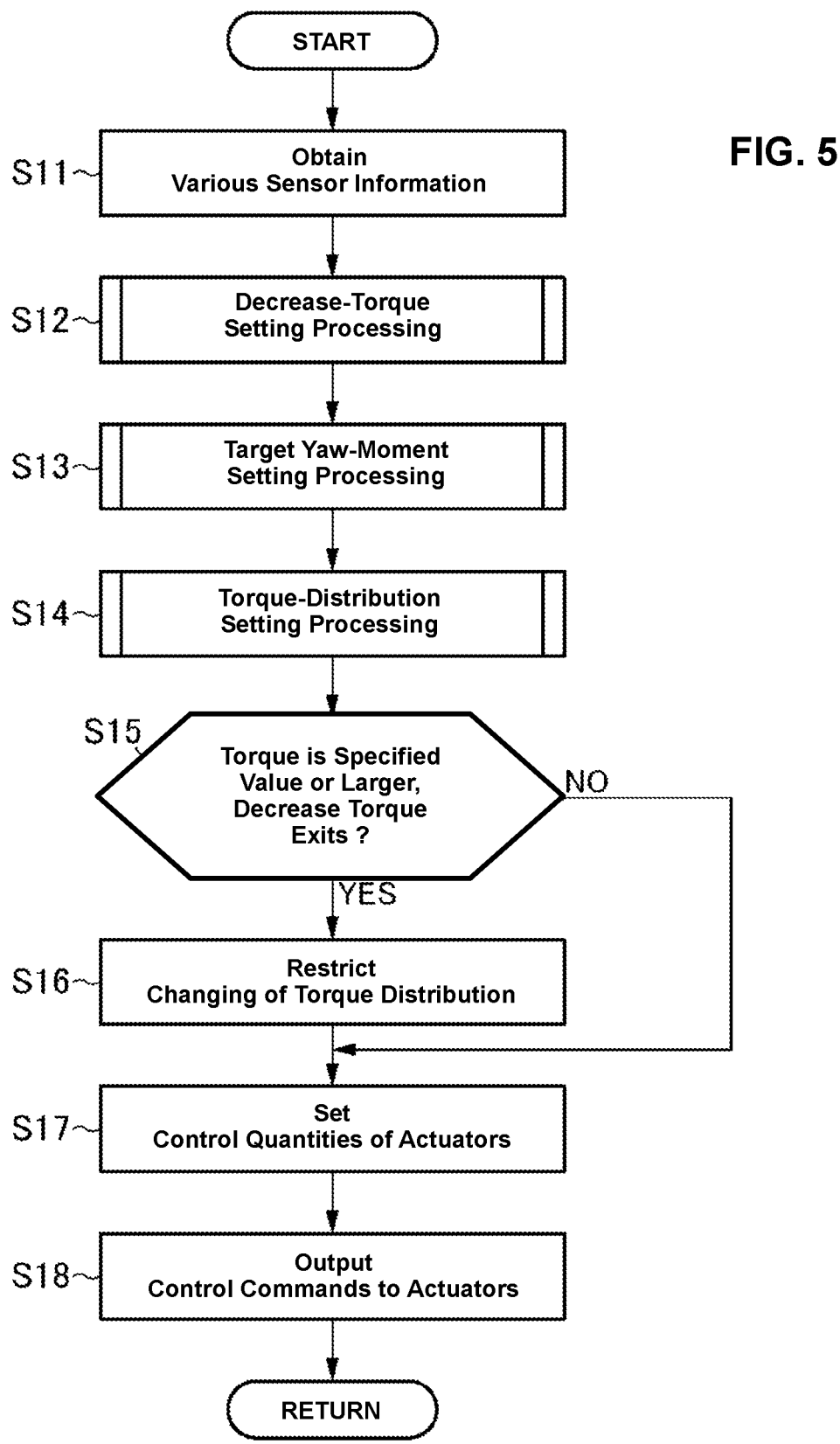
FIG. 5 is a flowchart showing a total control according to the embodiment of the present disclosure.
Figure 6:
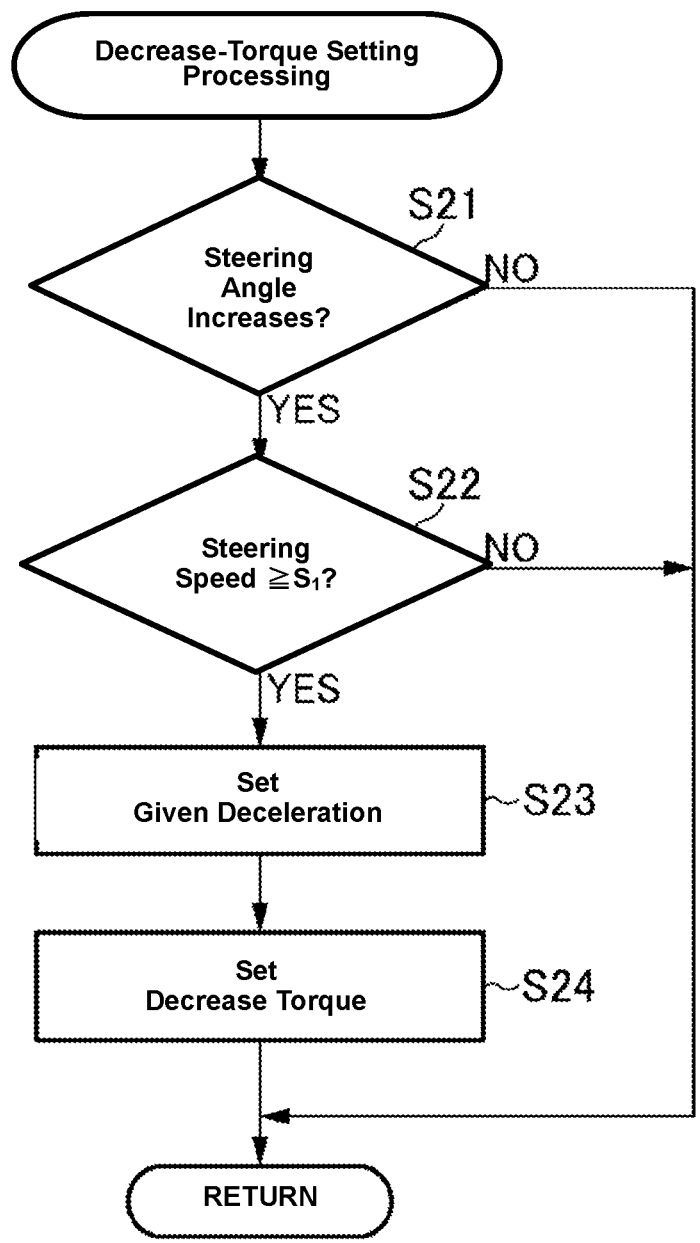
FIG. 6 is a flowchart showing a decrease-torque setting processing according to the embodiment of the present disclosure.
Figure 7:
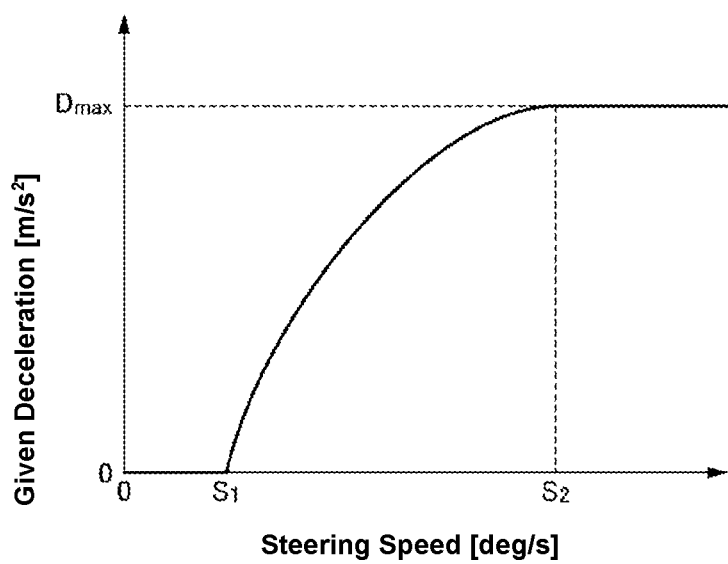
FIG. 7 is a map showing a relationship between given deceleration and a steering speed according to the embodiment of the present disclosure.
Figure 8:
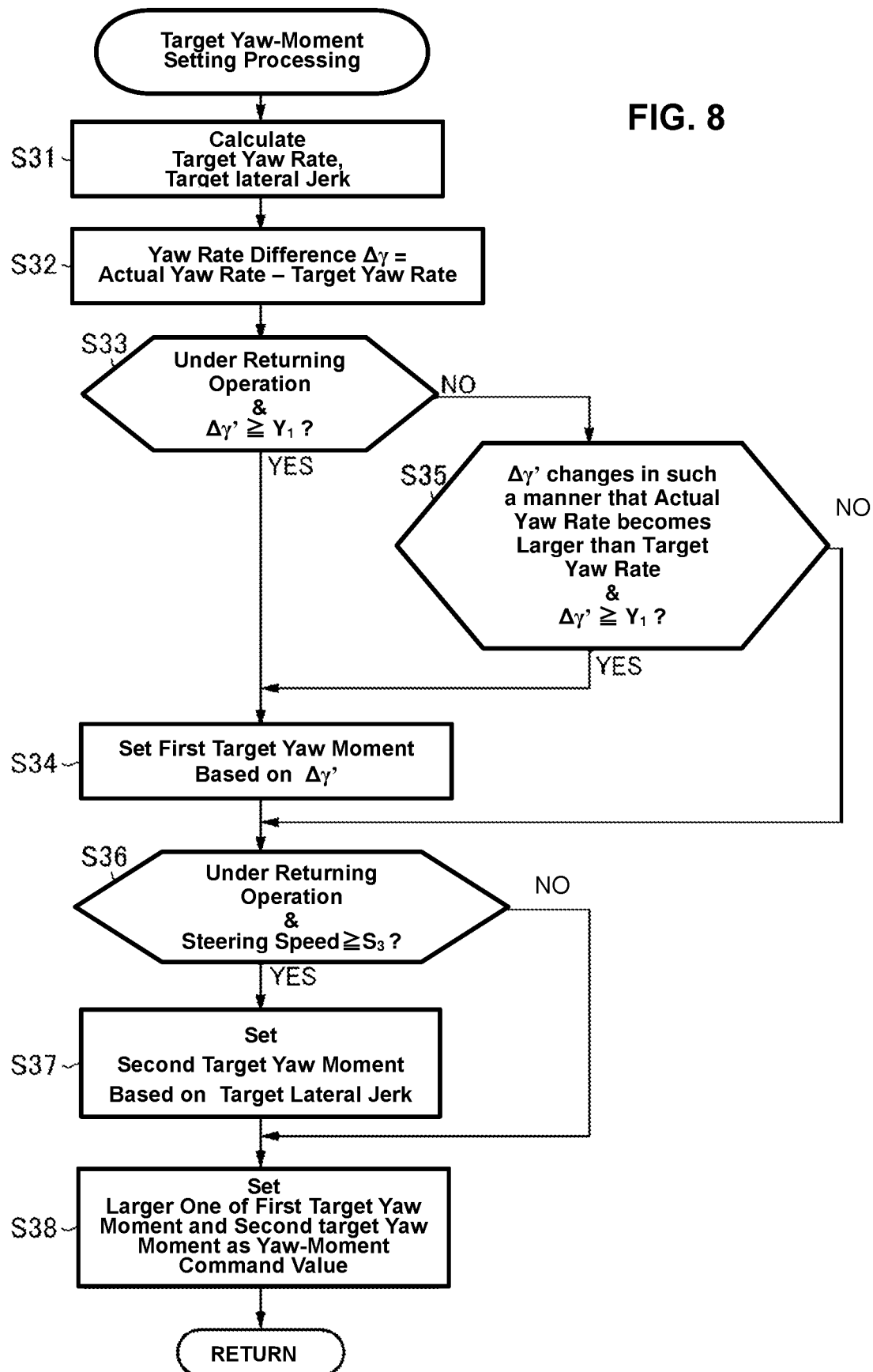
FIG. 8 is a flowchart showing a target yaw-moment setting processing according to the embodiment of the present disclosure.
Figure 10D:
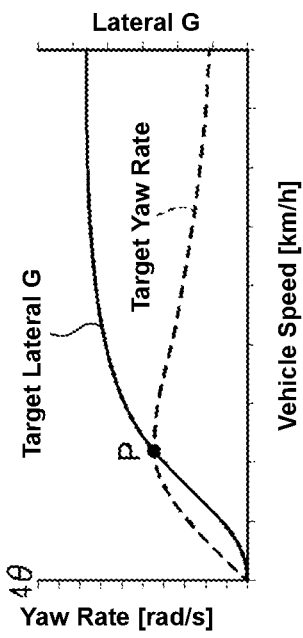
FIGS. 10A-10F are maps for setting a target yaw rate and target lateral acceleration according to the embodiment of the present disclosure.
Figure 10E:
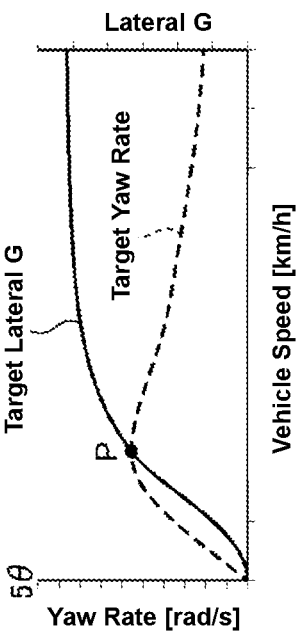
Figure 10F:
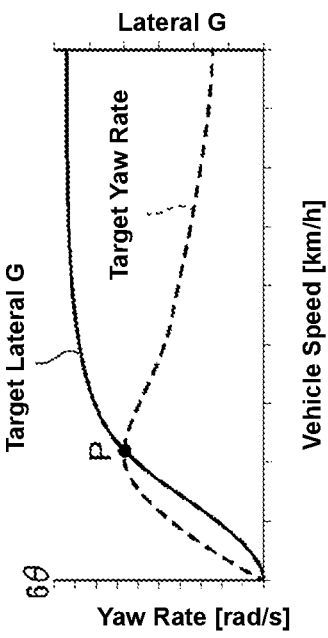
Figure 10A:
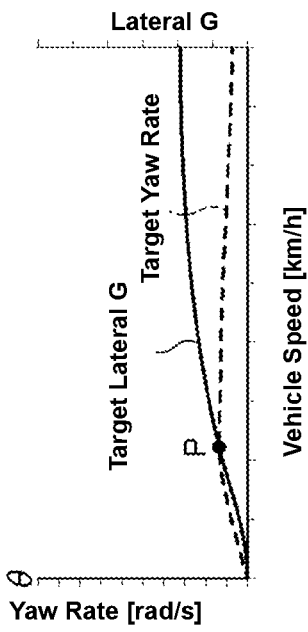
Figure 10B:
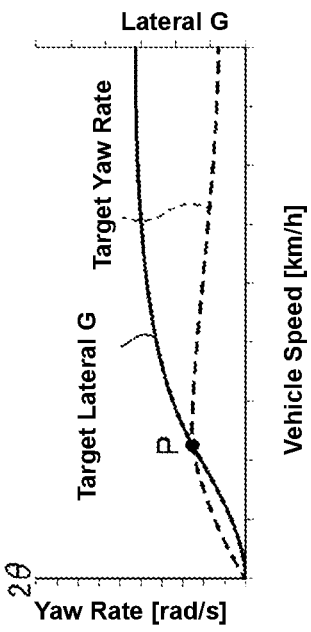
Figure 10C:
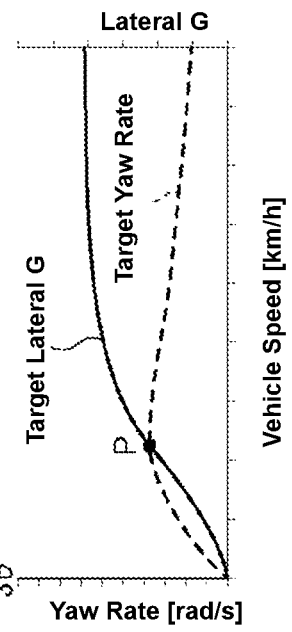
Figure 11A:
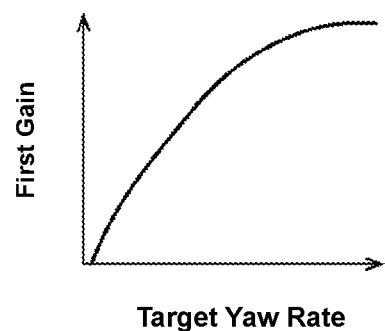
FIGS. 11A and 11B are maps for setting a first gain and a second gain according to the embodiment of the present disclosure.
Figure 11B:
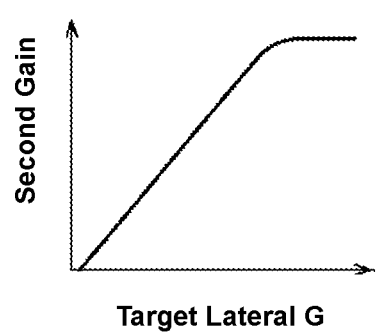

Next, the control contents executed by the controller 50 of the present embodiment will be described specifically referring to FIGS. 5 through 11A, B. FIG. 5 is a flowchart showing a total control according to the embodiment of the present disclosure. FIG. 6 is a flowchart showing a decrease-torque setting processing according to the embodiment of the present disclosure, which is executed in the total control of FIG. 5. FIG. 7 is a map showing a relationship between given deceleration and a steering speed according to the embodiment of the present disclosure, which is used in the decrease-torque setting processing of FIG. 6. FIG. 8 is a flowchart showing a target yaw-moment setting processing according to the embodiment of the present disclosure, which is executed in the total control of FIG. 5. FIG. 9 is a flowchart showing a torque-distribution setting processing according to the embodiment of the present disclosure, which is executed in the total control of FIG. 5, FIGS. 10A-10F are maps for setting a target yaw rate and target lateral acceleration according to the embodiment of the present disclosure, which are used in the torque-distribution setting processing of FIG. 9, and FIGS. 11A and 11B are maps for setting a first gain and a second gain according to the embodiment of the present disclosure, which are used in the torque-distribution setting processing of FIG. 9.

The control processing of FIG. 5 is started when a power is applied to the controller 50 by turning on an ignition switch of the vehicle 1 and executed repeatedly in a specified cycle (e.g., 50 ms). After the control processing is started, the controller 50 obtains various sensor information on driving conditions of the vehicle 1 in step S11. Specifically, the controller 50 obtains various information from the detection signals outputted by the above-described various sensors as the information on the driving conditions, wherein the various information includes a steering angle detected by the steering angle sensor 8, the accelerator opening degree detected by the accelerator opening-degree sensor 10, the vehicle speed detected by the vehicle speed sensor 12, the yaw rate detected by the yaw rate sensor 13, the acceleration detected by the acceleration sensor 14, the pressing amount of the brake pedal detected by the brake pressing amount sensor 15, an engine speed, a gear stage currently set in the transmission 5a of the vehicle 1, and so on.

In the next step S12, the controller 50 executes the decrease-torque setting processing to set the torque (decrease torque) to give the deceleration to the vehicle 1 in accordance with the operation of the steering wheel 6 as shown in FIG. 6. In this step S12, the controller 50 sets the decrease torque to decrease the torque of the engine 4 in accordance with an increase of the steering angle of the steering device 7, i.e., in accordance with the turning operation of the steering wheel 6. In the present embodiment, the controller 50 controls the vehicle attitude by decreasing the torque temporarily and thereby giving the deceleration to the vehicle 1 when the steering wheel 6 is turned (the second vehicle attitude control).

As shown in FIG. 6, after the decrease-torque setting processing is started, it is determined in step S21 whether the steering angle (absolute value) of the steering device 7 increases or not, i.e., whether the steering wheel 6 is turned or not. When it is determined that the steering angle increases (YES: the step S21), the controller 50 proceeds to step S22, where it is determined whether or not the steering speed is a specified threshold $S_1$ or higher. Herein, the controller 50 calculates the steering speed based on the steering angle obtained by the steering angle sensor 8 in the step S11 of FIG. 5, and determines whether or not this calculated speed is the threshold $S_1$ or higher.

When it is determined that the steering speed is the threshold $S_1$ or higher (YES: the step S22), the controller 50 proceeds to step S23 and sets the given deceleration based on the steering speed. This given deceleration is the deceleration to be given to the vehicle 1 in accordance with the steering operation in order to control the vehicle attitude according to driver's intention.

Specifically, the controller 50 sets the given deceleration which corresponds to the steering speed calculated in the step S22 based on the relationship between the given deceleration and the steering speed shown in the map of FIG. 7. In FIG. 7, a lateral axis shows the steering speed and a vertical axis shows the given deceleration. As shown in FIG. 7, when the steering speed is the threshold $S_1$ is lower, the given deceleration corresponding to the steering speed is 0 (zero). That is, when the steering speed is the threshold $S_1$ is lower, the controller 50 does not execute a control to give deceleration to the vehicle 1 in accordance with the steering operation.

Meanwhile, in the case where the steering speed exceeds the threshold $S_1$, the given deceleration corresponding to the steering speed gradually approach a specified upper limit value $D_{max}$ as the steering speed increases. That is, the given deceleration increases as the steering speed increases, and an increasing rate of the given deceleration becomes smaller. The above-described upper limit value $D_{max}$ is set at an appropriate value such that the driver does not feel any control intervention even if the deceleration has been given to the vehicle 1 in accordance with the operation of the steering wheel (e.g., 0.5 m/s² ÷ 0.05G). Further, in a case where the steering speed is a threshold $S_2$, which is larger than the threshold $S_1$, or higher, the given deceleration is maintained at the upper limit value $D_{max}$.

In the next step S24, the controller 50 sets the decrease torque based on the given deceleration set in the step S23. Specifically, the controller 50 decides the decrease torque which is necessary for achieving the given deceleration by the increase of the torque of the engine 4 based on the current (present) vehicle speed, the gear stage, road-surface inclination, and so on which are obtained in the step S11 of FIG. 5. After the step S24, the controller 50 ends the decrease-torque setting processing, then returns to the main routine of FIG. 5.

Meanwhile, when it is determined in the step S21 that the steering angle does not increase (NO: the step S21), or when it is determined in the step S22 that the steering speed is lower than the threshold $S_1$ (NO: the step S22), the controller 50 ends the decrease-torque setting processing without setting the decrease torque, then returns to the main routine of FIG. 5. In this case, the decrease torque becomes 0 (zero).

Returning to FIG. 5, the controller 50 proceeds to step S13 after the above-described decrease-torque setting processing (step S12), and executes the target yaw-moment setting processing of FIG. 8 and sets the target yaw moment to be given to the vehicle 1 in a fourth vehicle attitude control.

As shown in FIG. 8, after the target yaw-moment setting processing is started, the controller 50 calculates, in step S31, the target yaw rate and target lateral jerk based on the steering angle and the vehicle speed which are obtained in the step S11 of FIG. 5. In an example, the controller 50 calculates the target yaw rate by multiplying the steering angle by a coefficient depending on the vehicle speed. Further, the controller 50 calculates the target lateral jerk based on the steering speed and the vehicle speed.

In the next step S32, the controller 50 calculates a difference $\Delta\gamma$ between the yaw rate (actual yaw rate) detected by the yaw rate sensor 13 which is obtained in the step S11 of FIG. 5 and the target yaw rate calculated in the step S31.

In the next step S33, the controller 50 determines whether or not the steering wheel 6 is under returning operation (i.e., the steering angle is under decreasing) and a changing speed $\Delta\gamma'$ of the yaw rate difference is a threshold $Y_1$ or higher. Herein, this changing speed $\Delta\gamma'$ is obtained by differentiating the yaw rate difference $\Delta\gamma$ by time. When it is determined that the steering wheel 6 is under returning operation and also the changing speed $\Delta\gamma'$ of the yaw rate difference is the threshold $Y_1$ or higher, the controller 50 proceeds to step S34 and sets a yaw moment which has an opposite (reverse) direction to the actual yaw rate of the vehicle 1 as a first target yaw moment based on the changing speed $\Delta\gamma'$ of the yaw rate difference. Specifically, the controller 50 calculates a magnitude of the first target yaw moment by multiplying the changing speed $\Delta\gamma'$ of the yaw rate difference by a specified coefficient.

Meanwhile, when it is determined in the step S33 that the steering wheel 6 is not under returning operation (i.e., the steering angle is constant or under increasing), the controller 50 proceeds to step S35 and determines whether or not the changing speed $\Delta\gamma'$ of the yaw rate difference is changing in such a manner that the actual yaw rate becomes larger than the target yaw rate (i.e., in such a manner that a motion of the vehicle 1 becomes an oversteer state) and is the threshold $Y_1$ or larger. Specifically, the controller 50 determines that the changing speed $\Delta\gamma'$ of the yaw rate difference is changing in such a manner that the actual yaw rate becomes larger than the target yaw rate when the yaw rate difference decreases under a situation where the target yaw rate is the actual yaw rate or larger, or when the yaw rate difference increases under a situation where the target yaw rate is smaller than the actual yaw rate.

Consequently, when it is determined that the changing speed $\Delta\gamma'$ of the yaw rate difference is changing in such a manner that the actual yaw rate becomes larger than the target yaw rate and is the threshold $Y_1$ or larger, the controller 50 proceeds to the step S34, where the yaw moment which has the opposite (reverse) direction to the actual yaw rate of the vehicle 1 is set as the first target yaw moment based on the changing speed $\Delta\gamma'$ of the yaw rate difference.

After the step S34, or when it is determined in the step S35 that the changing speed $\Delta\gamma'$ of the yaw rate difference is not changing in such a manner that the actual yaw rate becomes larger than the target yaw rate or the changing speed $\Delta\gamma'$ of the yaw rate difference is smaller than the threshold $Y_1$, the controller 50 proceeds to step S36 and determines whether or not the steering wheel 6 is under returning operation (i.e., the steering angle is under decreasing) and the steering speed is a specified threshold $S_3$ or higher.

Consequently, when it is determined that the steering wheel 6 is under returning operation and the steering speed is the threshold $S_3$ or higher, the controller 50 proceeds to step S37, and sets a yaw moment which has the opposite (reverse) direction to the actual yaw rate of the vehicle 1 as a second target yaw moment based on the target lateral jerk calculated in the step S31. Specifically, the controller 50 calculates a magnitude of the second target yaw moment by multiplying the target lateral jerk by a specified coefficient.

After the step S37, or when it is determined in the step S36 that the steering wheel 6 is not under returning operation (i.e., the steering angle is constant or under increasing) and the steering speed is lower than the threshold $S_3$, the controller 50 proceeds to step S38 and sets a larger one of the first target yaw moment set in the step S34 and the second yaw moment set in the step S37 as a yaw-moment command value. After the step S38, the controller 50 ends the target yaw-moment setting processing, then returns to the main routine of FIG. 5.

Returning to FIG. 5, the controller 50 proceeds to step S14 after the above-described target yaw-moment setting processing (the step S13), and executes the torque-distribution setting processing of FIG. 9 and sets the torque distribution ratio of the front wheels 2a and the rear wheels 2b which is to be achieved by the control of the electromagnetic coupling 5e. Particularly, the controller 50 sets a torque to be finally distributed to the rear wheels by the control of the electromagnetic coupling 5e (hereafter, referred to as a "final distribution torque").

As shown in FIG. 9, after the torque-distribution setting processing is started, the controller 50 sets, in step S41, target acceleration/deceleration based on the vehicle speed, the accelerator opening degree, the pressing amount of the brake pedal and so on which are obtained in the step S11 of FIG. 5. In an example, the controller 50 selects an acceleration/deceleration characteristic map which corresponds to the current (present) vehicle speed and the set gear stage from plural acceleration/deceleration characteristic maps (which are previously made and memorized in a memory or the like) which are provided for the various types of vehicle and the various gear stages, and sets the target acceleration/deceleration corresponding to the current accelerator opening degree, the pressing amount of brake pedal and so on referring to the selected acceleration/deceleration characteristic map.

In the next step S42, the controller 50 decides the target torque to be generated at the engine 4 for achieving the target acceleration/deceleration set in the step S41. In this case, the controller 50 decides the target torque based on the current vehicle speed, the gear stage, the road-surface inclination, road-surface p and so on within a range of the torque which can be outputted by the engine 4.

Next, in step S43, the controller 50 sets a maximum torque which can be distributed to the rear wheels 2b (a maximum distribution torque) based on a ground-contact load ratio of the front wheels 2a and the rear wheels 2b and the target torque set in the step S42. Specifically, the controller 50 distributes the target torque to the front wheels 2a and the rear wheels 2b according to the ground-contact load ratio of the front wheels 2a and the rear wheels 2b (e.g., in a case where the ground-contact load ratio is [7:3], the target torque is distributed to the front wheels 2a and the rear wheels 2b at the rate of [7:3]). Thus, the torque distributed to the rear wheels 2b is set as the maximum distribution torque. Herein, in an example, the controller 50 uses the ground-contact load ratio which is provided when the vehicle 1 stops (e.g., [6:4]) as a standard, and calculates a current (present) ground-contact load of the vehicle 1 based on the magnitude of the acceleration/deceleration currently generated at the vehicle 1 and so on.

In the next step S44, the controller 50 sets the target yaw rate and the target lateral acceleration (target lateral G) which correspond to the current steering angle and the current vehicle speed which are obtained in the step S11 of FIG. 5 referring to the maps of FIGS. 10A-10F. The maps of FIGS. 10A-10F respectively provide the target yaw rate (vertical axis) and the target lateral acceleration (vertical axis) which are to be set according to the vehicle speed (lateral axis) for different steering angles θ, 2θ, 3θ, 4θ, 5θ, 6θ (θ<2θ<3θ<4θ<5θ<6θ). The target yaw rate is shown by a broken line and the target lateral acceleration is shown by a solid line. As shown in FIGS. 10A-10F, there is a tendency regarding the target yaw rate that the target yaw rate becomes larger as the vehicle speed becomes higher in a range where the vehicle speed is lower than a specified value, the target yaw rate becomes smaller as the vehicle speed becomes higher in a range where the vehicle speed is the specified value or higher. Further, there is a tendency regarding the target lateral acceleration that the target lateral acceleration becomes larger as the vehicle speed becomes higher and an increase rate of an increase amount of the target lateral acceleration becomes smaller. Further, there is a tendency that both of the target yaw rate and the target lateral acceleration become larger as the steering angle becomes larger (θ →2θ→3θ . . . →6θ) basically. Herein, a point P shown in FIGS. 10A-10F corresponds to the vehicle speed where a magnitude relationship between the target yaw rate and the target lateral acceleration is reversed. Further, while the maps corresponding to the six steering angles are shown in FIGS. 10A-10F, the maps corresponding to the steering angles which are more than six will be prepared actually.

In the next step S45, the controller 50 sets a first gain which corresponds to the target yaw rate set in the step S44 referring to the map of FIG. 11A. This first gain is a value to be applied for increasing or decreasing the torque distributed to the rear wheels 2b by the electromagnetic coupling 5e in order to generate the desired pitching at the vehicle body 1a in the first-and-third vehicle attitude controls. As shown in FIG. 11A, the map is provided such that the first gain (vertical axis) becomes larger as the target yaw rate (lateral axis) becomes larger. Specifically, this map is provided such that a relationship between the target yaw rate and the first gain is nonlinear and the first gain is set at a specified upper limit value or gradually approaches this upper limit value as the target yaw rate increases. According to this map, the first gain increases as the target yaw rate increases and its increasing rate becomes smaller.

In the next step S46, the controller 50 sets a second gain which corresponds to the target lateral acceleration set in the step S44 referring to the map of FIG. 11B. This second gain is also a value to be applied for increasing or decreasing the torque distributed to the rear wheels 2b by the electromagnetic coupling 5e in order to generate the desired pitching at the vehicle body 1a in the first-and-third vehicle attitude controls. As shown in FIG. 11B, the map is provided such that the second gain (vertical axis) becomes larger as the target lateral acceleration (lateral axis) becomes larger. Specifically, this map is provided such that a relationship between the target lateral acceleration and the second gain is substantially linear in a range where the target lateral acceleration is smaller than a specified value, and the second gain is set at a specified upper limit value regardless of the magnitude of the target lateral acceleration in a range where the target lateral acceleration is the specified value or larger.

In the next step S47, the controller 50 determines whether or not the target yaw rate set in the step S44 is the specified value or larger and the target lateral acceleration set in the step S44 is the specified value or larger. Herein, the controller 50 determines whether or not it is now a situation for executing the vehicle attitude control according to the present embodiment, that is—whether or not it is now under the vehicle turning-in or turning-out operation where the steering wheel 6 is turned or returned.

Consequently, when the target yaw rate is the specified value or larger and the target lateral acceleration is the specified value or larger (YES: the step S47), the controller 50 proceeds to step S48 and sets the final distribution torque applied to the rear wheels 2b by multiplying the maximum distribution torque set in the step S43 by a larger one of the first gain set in the step S45 and the second gain set in the step S46. That is, the controller 50 sets the final distribution torque by changing the maximum distribution torque by adopting any one of the first and second gains which is capable of changing the maximum distribution torque more greatly.

Herein, since the steering angle becomes larger when the steering wheel 6 is turned, the target yaw rate and the target lateral acceleration which are set become larger (see FIGS. 10A and 10B) and the first gain and the second gain become larger (see FIGS. 11A and 11B). Consequently, the final distribution torque applied to the rear wheels 2b increases by adopting the first gain and the second gain to the maximum distribution torque of the rear wheels 2b. Thereby, the control to increase the torque distributed to the rear wheels 2b in order to generate the nose-dive-direction pitching at the vehicle body 1a when the steering wheel 6 is turned (the first vehicle attitude control) is achieved. Meanwhile, since the steering angle becomes smaller when the steering wheel 6 is returned, the target yaw rate and the target lateral acceleration which are set become smaller (see FIGS. 10A and 10B) and the first gain and the second gain become smaller (see FIGS. 11A and 11B). Consequently, the final distribution torque applied to the rear wheels 2b decreases by adopting the first gain and the second gain to the maximum distribution torque of the rear wheels 2b. Thereby, the control to decrease the torque distributed to the rear wheels 2b in order to generate the rearward-tilt-direction pitching at the vehicle body 1a when the steering wheel 6 is turned (the third vehicle attitude control) is achieved.

Meanwhile, when the target yaw rate is smaller than the specified value and the target lateral acceleration is smaller than the specified value (NO: the step S47), the controller 50 proceeds to step S49. In this case, since the vehicle 1 is not in the vehicle-turning state, it is not now the situation where the vehicle attitude control according to the present embodiment should be executed. Accordingly, the controller 50 sets the final distribution torque which has the minimum total amount of the energy losses in the step S49. Specifically, the controller 50 sets the torque distribution ratio of the front wheels 2a and the rear wheels 2b which is to be applied referring to the map of FIG. 3. That is, the controller 50 obtains the total amount of energy loss caused by the slip of the front wheels 2a, the energy loss caused by the slip of the rear wheels 2b, and the energy loss corresponding to the mechanical loss of the torque transmitting mechanism caused by the power transmission to the rear wheels 2b, and decides the torque distribution ratio which has the minimum total amount of energy losses. Then, the controller 50 sets the final distribution torque corresponding to this torque distribution ratio.

After these steps S48 or S49, the controller 50 ends the torque-distribution setting processing and returns the main routine of FIG. 5.

Returning to FIG. 5, the controller 50 proceeds to step S15 after the above-described torque-distribution setting processing (the step S14), and determines whether or not the current torque (actual torque) of the engine 4 is a specified value or larger and the decrease torque exists (i.e., the decrease torque is set in the decrease-torque setting processing (the step S12) of FIG. 6). A value corresponding to the decrease torque (e.g., a value based on a maximum value of the assumed decrease torque) is used as the above-described specified value adopted in determination of the torque of the engine 4. Thereby, judgement as to whether or not the engine 4 is under the state where the decrease torque can be achieved, that is—whether or not the torque of the engine 4 can be properly decreased based on the decrease torque, can be done by determining whether or not the torque of the engine 4 is the specified value or larger. Typically, in a case where the accelerator is OFF, the torque of the engine 4 is smaller than the specified value, so that the torque of the engine 4 can be properly decreased based on the decrease torque.

When the torque of the engine 4 is the specified value or larger and the decrease torque exists (YES: the step S15), the controller 50 proceeds to step S16. In this case, since the decrease torque is set and the engine 4 is under the state where the decrease torque can be achieved, the controller 50 executes the control to decrease the torque of the engine 4 by the decrease torque in accordance with the turning operation of the steering wheel 6 (the second vehicle attitude control), and also restricts changing of the torque distribution ratio by means of the electromagnetic coupling 5e (the step S16). That is, the controller 50 restricts the changing of the torque distribution ratio for achieving the final distribution torque set by the torque-distribution setting processing (the step S14) of FIG. 9. In an example, the controller 50 controls the electromagnetic coupling 5e such that a changing speed of the torque distribution ratio is lower than a specified limit speed, typically such that the torque distribution ratio changes at a constant limit speed. In another example, the controller 50 prohibits changing of the torque distribution ratio by the electromagnetic coupling 5e so as to maintain the torque distribution ratio constantly. After this step S16, the controller 50 proceeds to step S17.

Meanwhile, when the torque of the engine 4 is smaller than the specified value or the decrease torque does not exist (NO: the step S15), the controller 50 proceeds to step S17 without performing the above-described control of the step S16. This situation of proceeding to the step S17 corresponds to a case where the decrease torque is not set, such as a case where the vehicle 1 travels substantially straightly, a case where the vehicle 1 is in the steady turning state after the turning operation of the steering wheel 6 but before the returning operation of the steering wheel 6, and a case where the vehicle 1 is under a recovery motion from the vehicle turning which is caused by the returning operation of the steering wheel 6, in addition to a case where the torque of the engine 4 is smaller than the specified value which is caused by the accelerator OFF state and the like. In this case, the controller 50 performs the control based on the final distribution torque set by the torque-distribution setting processing (the step S14) of FIG. 9 (including the target yaw moment set by the target yaw-moment setting processing (the step S13) of FIG. 8). Thereby, in the case where the decrease torque is set in accordance with the turning operation of the steering wheel 6 when the torque of the engine 4 is smaller than the specified value, the first vehicle attitude control is performed instead of the second vehicle attitude control. Further, in the case where the returning operation of the steering wheel 6 is conducted, the third vehicle attitude control is performed (the fourth vehicle attitude control is performed as well in this case).

Next, the controller 50 sets control quantities of the respective actuators according to results of the above-described processing in step S17, and outputs control commands to the respective actuators based on the set control quantities in step S18. Specifically, the controller 50 outputs the control command to the engine 4 in a case where the control based on the decrease torque set by the decrease-torque setting processing of FIG. 6 (the second vehicle attitude control) is performed. For example, the controller 50 delays (retards) the ignition timing of the ignition plug 4c from the timing for generating an original torque to which the decrease torque has not been applied yet. Further, the controller 50 decreases the amount of intake air by decreasing an throttle opening degree of the throttle valve 4a or controlling the variable valve-driving mechanism 4d so as to delay a closing timing of an intake valve which has been set after a bottom dead center in place of or in addition to the delay of the ignition timing. In this case, the controller 50 decreases the amount of fuel injection injected by the injector 4b in accordance with decreasing of the amount of intake air so that a specified air-fuel ration can be maintained. Herein, in a case where the engine 4 is a diesel engine, the controller 50 decreases the amount of fuel injection injected by the injector 4b from the amount of fuel injection for generating an original torque to which the decrease torque has not been applied yet.

Further, the controller 50 outputs the control command to the electromagnetic coupling 5e in a case where the control based on the final distribution torque set by the torque-distribution setting processing of FIG. 9 is performed. Specifically, the controller 50 controls the electromagnetic coupling 5e so as to set its coupling degree (coupling torque) at a degree corresponding to the final distribution torque, thereby applying the set final distribution torque of the rear wheels 2b. In this case, the controller 50 supplies the applied electric current according to the final distribution torque of the rear wheels 2b. Herein, the controller 50 controls the electromagnetic coupling 5e so as to restrict the changing of the torque distribution ratio in a case where the processing of the step S16 of FIG. 5 is performed.

Moreover, the controller 50 outputs the control command to the brake control system 20 so that the target yaw moment is given the vehicle 1 by means of the brake device 20a in a case where the control based on the target yaw moment set by the target yaw-moment setting processing of FIG. 8 is performed. The brake control device 20 is configured to previously memorize a map providing a relationship between a yaw-moment command value and a rotational speed of the brake-fluid pressure pump 20b, and operates this pump 20b with a rotational speed which corresponds to the yaw-moment command value set by the target yaw-moment setting processing referring to this map (for example, the rotational speed of the brake-fluid pressure pomp 20b is increased to the speed corresponding to the yaw-moment command value by increasing the electric power supplied to the brake-fluid pressure pomp 20b). Additionally, the brake control device 20 is, for example, configured to previously memorize a map providing a relationship between the yaw-moment command value and the opening degree of the valve unit 20c, and controls the valve unit 20c referring to this map so that the opening degree corresponding to the yaw-moment command value can be obtained (for example, an opening degree of a solenoid valve is increased up to an opening degree corresponding to a braking-force command value by increasing an electric power supplied to the solenoid valve), thereby adjusting the braking force of the respective wheels.

<Operations and Effects>

Hereafter, operations and effects of the vehicle system according to the embodiment of the present disclosure will be described.

FIG. 12 is a time chart with various parameters, which shows an example in a case where the vehicle attitude control according to the embodiment of the present disclosure is executed when the vehicle 1 has the vehicle turn-in operation, the steady turning state, and the vehicle turn-out operation in order. The time chart of FIG. 12 shows in order, from above, the accelerator opening degree of the accelerator (acceleration pedal), the steering angle of the steering 6, the steering speed of the steering 6, the decrease torque of the engine 4 set by the decrease-torque setting processing (the step S12 of FIG. 5) of FIG. 6, the final target torque finally applied to the engine 4, the target yaw moment set by the target yaw-moment setting processing (the step S13 of FIG. 5) of FIG. 8, the coupling torque (coupling degree) of the electromagnetic coupling 5e, and the pitching motion of the vehicle 1. Herein, the final target torque exemplified in FIG. 12 is the torque which is obtained by applying the decrease torque to the target torque (the step S42 of FIG. 9) set from the target acceleration/deceleration, and in a case where the decrease torque is not set, the target torque becomes the final target torque simply.

First, when the steering wheel 6 is turned, i.e., in the vehicle turn-in operation, the steering angle and the steering speed increase. Consequently, the steering speed becomes the threshold $S_1$ or higher at a timing of the time t11 (YES: the step S22 of FIG. 6), and the decrease torque is set based on the given deceleration according to the steering speed (the steps S23, S24 of FIG. 6). In the example shown in FIG. 12, in a state where the decrease torque is set, the accelerator is ON and the torque of the engine 4 is the specified value or larger (YES: the step S15 of FIG. 5), that is—the engine 4 is under a situation where the decrease torque can be achieved. Accordingly, the final target torque which is obtained by decreasing the decrease torque from the target torque is set, and the engine 4 is controlled based on this final target torque. That is, the second vehicle attitude control where the torque of the engine 4 is decreased in accordance with the turning operation of the steering wheel 6 is executed. According to this execution of the second vehicle attitude control, the deceleration is given to the vehicle 1 because of the decrease of the torque, so that the nose-dive-direction pitching is generated at the vehicle body 1a, thereby having the driver feel the responsiveness to the diver's operation for the vehicle turn-in operation of the vehicle 1.

Meanwhile, when the second vehicle attitude control is executed, the changing of the torque distribution ratio by the electromagnetic coupling 5e is restricted (the step S16 of FIG. 5), not relying on the torque-distribution setting processing of FIG. 9. Specifically, the electromagnetic coupling 5e is controlled such that the coupling torque of the electromagnetic coupling 5e moderately changes (increases) at the constant limit speed. That is, in the situation shown in FIG. 12, the first vehicle attitude control to increase the torque distributed to the rear wheels 2b when the steering wheel 6 is turned is not executed. Thereby, it can be securely suppressed that the desired pitching is not properly generated because of execution of the first vehicle attitude control during the execution of the second vehicle attitude control.

After this, when the steering speed is decreased while the second vehicle attitude control is executed, the steering speed becomes lower than the threshold $S_1$ (NO: the step S22 of FIG. 6) at a timing of the time t12 and the second vehicle attitude control ends. Further, when the steering speed is decreased as described above (right before the time t12), restricting of the changing of the coupling torque of the electromagnetic coupling 5e is released according to decreasing of the decrease torque (absolute value), and the electromagnetic coupling 5e is controlled such that the coupling torque changes (increases) quickly. Then, the steering angle becomes substantially constant between the time t12 and the time t13, so that the vehicle 1 has the steady turning. Herein, the coupling torque of the electromagnetic coupling 5e is maintained at the constant value, so that the pitching motion of the vehicle 1 becomes constant (stabilized). Thereby, the ground-contact feeling can be given to the driver in the steady turning state of the vehicle 1.

After this, when the steering wheel 6 is returned, i.e., in the vehicle turn-out operation, the steering angle and the steering speed decrease. Consequently, the coupling torque of the electromagnetic coupling 5e is decreased between the time t13 and the time t14 according to the torque-distribution setting processing of FIG. 9. That is, according to decreasing of the steering angle, the target yaw rate and the target lateral acceleration which are set become smaller (see the step S44 of FIG. 9 and FIGS. 10A-10F) and the first gain and the second gain which are set become smaller (see the steps S45, S46 of FIG. 9 and FIGS. 11A, 11B). Consequently, the final distribution torque applied to the rear wheels 2b where the first gain or the second gain are adopted decreases (the step S48 of FIG. 9), so that the coupling torque of the electromagnetic coupling 5e is decreased. Since the torque distributed to the rear wheels 2b decreases when the coupling torque of the electromagnetic coupling 5e is decreased, the third vehicle attitude control to decrease the torque applied to the rear wheels 2b in accordance with the returning operation of the steering wheel 6 is executed between the time t13 and the time t14. The rearward-tilt-direction pitching is generated at the vehicle body 1a by the above-described third vehicle attitude control, thereby having the driver feel the stability.

Meanwhile, in the returning operation of the steering wheel 6, the target yaw moment is set by the target yaw-moment setting processing of FIG. 8 from the time t13 (see the steps S34, S37, S38 of FIG. 8). Consequently, the control to apply the braking force to the turning outer wheels so that the yaw moment having the opposite direction to the currently-generated yaw rate at the vehicle 1 can be given to the vehicle 1 (the fourth vehicle attitude control) is executed in addition to the above-described third vehicle attitude control. Thereby, the recovery performance from the vehicle turning can be effectively improved.

Figure 13:
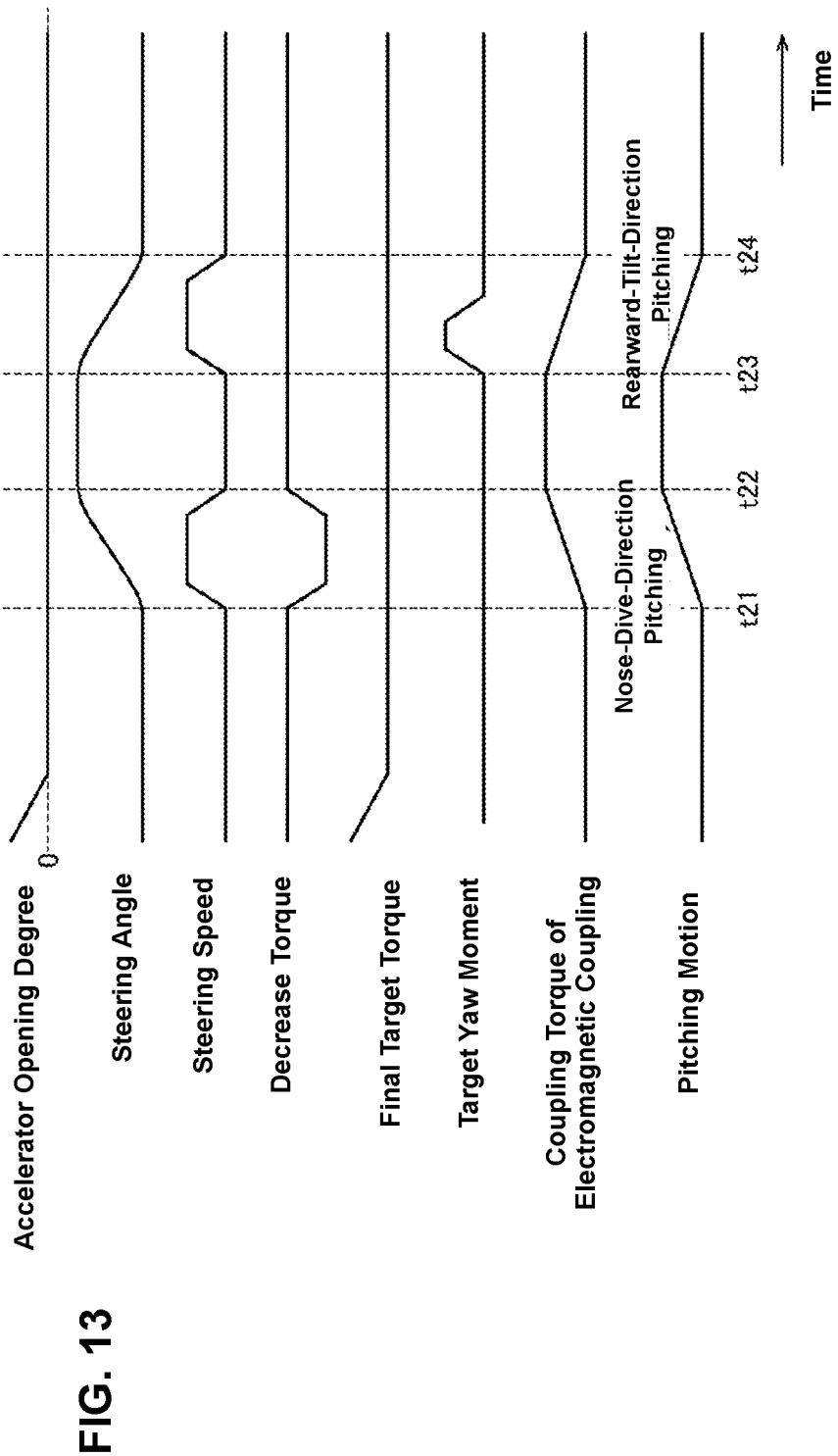
FIG. 13 is a time chart showing another example in the case where the vehicle attitude control according to the embodiment of the present disclosure is executed.

FIG. 13 is a time chart with various parameters, which shows another example in the case where the vehicle attitude control according to the embodiment of the present disclosure is executed when the vehicle 1 has the vehicle turn-in operation, the steady turning state, and the vehicle turn-out operation in order. Similarly to FIG. 12, the time chart of FIG. 13 shows in order, from above, the accelerator opening degree of the accelerator (acceleration pedal), the steering angle, the steering speed, the decrease torque, the final target torque, the target yaw moment, the coupling torque of the electromagnetic coupling 5e, and the pitching motion of the vehicle 1. Herein, only different points from the time chart of FIG. 12 will be described (the others are the same as those of FIG. 12).

First, when the steering wheel 6 is turned, i.e., in the vehicle turn-in operation, the steering angle and the steering speed increase. Consequently, the steering speed becomes the threshold $S_1$ or higher at a timing of the time t21 (YES: the step S22 of FIG. 6), and the decrease torque is set based on the given deceleration according to the steering speed (the steps S23, S24 of FIG. 6). In the example shown in FIG. 13, in a state where the decrease torque is set, the accelerator is OFF and the torque of the engine 4 is smaller than the specified value (NO: the step S15 of FIG. 5), that is—the engine 4 is not under the situation where the decrease torque can be achieved. Accordingly, the final target torque which is obtained by decreasing the decrease torque from the target torque is not set (specifically, the final target torque becomes nearly 0 because the accelerator is OFF). That is, while the decrease torque is set, the second vehicle attitude control using this decrease torque is not executed.

Instead of non-execution of the second vehicle attitude control, the coupling torque of the electromagnetic coupling 5e is increased between the time t21 and the time t22 according to the torque-distribution setting processing of FIG. 9. That is, according to increasing of the steering angle, the target yaw rate and the target lateral acceleration which are set become larger (see the step S44 of FIG. 9 and FIGS. 10A-10F) and the first gain and the second gain which are set become larger (see the steps S45, S46 of FIG. 9 and FIGS. 11A, 11B). Consequently, the final distribution torque applied to the rear wheels 2b where the first gain or the second gain are adopted increases (the step S48 of FIG. 9), so that the coupling torque of the electromagnetic coupling 5e is increased. Since the torque distributed to the rear wheels 2b increases when the coupling torque of the electromagnetic coupling 5e is increased, the first vehicle attitude control to increase the torque applied to the rear wheels 2b in accordance with the turning operation of the steering wheel 6 is executed between the time t21 and the time t22. The nose-dive-direction pitching is generated at the vehicle body 1a by the above-described first vehicle attitude control, thereby having the driver feel the responsiveness to the diver's operation for the vehicle turn-in operation of the vehicle 1. Herein, the control after the time t22 is similar to the control after the time t12 of FIG. 12.

As described above, according to the present embodiment, the controller 50 controls the electromagnetic coupling 5e such that the torque distributed to the rear wheels 2b is increased when the steering wheel 6 is turned, i.e., in the vehicle turn-in operation (the first vehicle attitude control). As the torque applied to the rear wheels 2b is increased, the force F1 to drive the rear wheels 2b forwardly is transmitted from the rear wheels 2b to the vehicle body 1a through the suspension 3. Herein, since the suspension 3 is configured to extend obliquely upwardly from the center axis 2b1 of the rear wheel 2b toward the attachment portion 3a to the vehicle body 1a, the upward element F11 of the above-described force F1 to drive the rear wheels 2b forwardly is generated at the vehicle body 1a, that is—the force F11 to lift up the rear part of the vehicle body 1a upwardly acts on the vehicle body 1a instantaneously. Consequently, the moment Y1 to move the vehicle body 1a in the nose-dive direction is so generated that the nose-dive-direction pitching can be generated at the vehicle body 1a. This generation of the nose-dive-direction pitching can have the driver feel the responsiveness to the diver's operation for the vehicle turn-in operation when the steering wheel 6 is turned. Further, because of the above-described moment Y1 of generating the nose-dive-direction pitching of the vehicle body 1a, the force F12 to lower the front part of the vehicle body 1a downwardly acts on the vehicle body 1a, so that the front-wheel load is increased. Thereby, the turning responsiveness of the vehicle 1 when the steering wheel 6 is turned can be improved.

Further, according to the present embodiment, the controller 50 controls the electromagnetic coupling 5e such that the torque distributed to the rear wheels 2b is decreased when the steering wheel 6 is returned, i.e., in the vehicle turn-out operation (the third vehicle attitude control). As the torque applied to the rear wheels 2b is decreased, the force F2 to pull back the rear wheels 2b rearwardly is transmitted from the rear wheels 2b to the vehicle body 1a through the suspension 3. Herein, since the suspension 3 is configured to extend obliquely downwardly from the attachment portion 3a of the vehicle body 1a toward the center axis 2b1 of the rear wheel 2b, the downward element F21 of the above-described force F2 to pull back the rear wheels 2b rearwardly is generated at the vehicle body 1a, that is—the force F21 to lower the rear part of the vehicle body 1a downwardly acts on the vehicle body 1a instantaneously. Consequently, the moment Y2 to move the vehicle body 1a in the rearward-tilt direction is so generated that the rearward-tilt-direction pitching can be generated at the vehicle body 1a. This generation of the rearward-tilt-direction pitching can have the driver feel the stability in the vehicle turn-out operation when the steering wheel 6 is returned. Further, because of the above-described moment Y2 of generating the rearward-tilt-direction pitching of the vehicle body 1a, the force F22 to lift up the front part of the vehicle body 1a upwardly acts on the vehicle body 1a, so that the front-wheel load is decreased. Thereby, the turning responsiveness of the vehicle 1 when the steering wheel 6 is returned, i.e., the recovery performance from the vehicle turning (the recovery performance toward the straight advance direction of the vehicle 1) can be improved.

Moreover, according to the present embodiment, the electromagnetic coupling 5e is configured such that the rotational speed of the output shaft is lower than that of the input shaft when the torque of the engine 4 is smaller than the specified value, and the controller 50 controls the electromagnetic coupling 5e such that the coupling degree of the electromagnetic coupling 5e is increased in a case where the turning operation of the steering wheel 6 is performed when the torque of the engine 4 is smaller than the specified value. Thereby, the torque applied to the rear wheels 2b is increased by the increase of the rotational speed of the output shaft of the coupling. Thus, according to the present embodiment, the torque applied to the rear wheels 2b can be properly increased by the control of the electromagnetic coupling 5e even in a state where the engine 4 generates little torque, so that the above-described nose-dive-direction pitching can be properly generated at the vehicle body 1a. Additionally, according to the present embodiment, the nose-dive-direction pitching can be properly generated at the vehicle body 1a by the above-described control of the electromagnetic coupling 5e even in a situation where the control of the vehicle attitude cannot be achieved by adjusting (particularly, decreasing) of the torque generated by the engine 4 because the torque of the engine 4 is lower than the specified value.

Also, according to the present embodiment, in the case where the turning operation of the steering wheel 6 is performed when the torque of the engine 4 is the specified value or larger, the control to increase the torque distributed to the rear wheels 2b by means of the electromagnetic coupling 5e (the first vehicle attitude control) is suppressed, and the control to decrease the torque of the engine 4 in accordance with the turning operation of the steering wheel 6 (the second vehicle attitude control) is executed. According to the execution of this second vehicle attitude control as well, the nose-dive-direction pitching can be properly generated at the vehicle body 1a in the vehicle turn-in operation by giving the deceleration to the vehicle 1 through the torque decrease of the engine 4. Further, according to the present embodiment, since the performance of the first vehicle attitude control is suppressed while the second vehicle attitude control is executed, it can be securely prevented that the desired pitching is not properly generated because of both executions of the first-and-second vehicle attitude controls.

Further, since the controller 50 suppresses the electromagnetic coupling 5e for changing the torque distributed to the rear wheels 2b in the steady turning state of the vehicle 1 after the turning operation of the steering wheel 6 and before the returning operation of the steering wheel 6, the pitching motion of the vehicle 1 can be stabilized in the steady turning state, thereby giving the driver the ground-contact feeling.

Additionally, according to the present embodiment, the controller 50 executes the control to apply the braking force to the turning outer wheels so as to give the yaw moment which has the opposite direction to the yaw rate generated at the vehicle 1 (the fourth vehicle attitude control) when the steering wheel 6 is returned (i.e., when the returning operation of the steering wheel 6 is conducted), in addition to the above-described third vehicle attitude control. Thereby, the recovery performance from the vehicle turning can be effectively improved.

MODIFIED EXAMPLES

Hereafter, modified examples of the above-described embodiment will be described. The following plural modified examples can be combined properly.

Modified Example 1

While the first vehicle attitude control and the second vehicle attitude control are used as achieving means for generating the nose-dive-direction pitching at the vehicle body 1a when the steering wheel 6 is turned in the above-described embodiment (the both controls are not executed concurrently basically as described above), only the first vehicle attitude control may be used as the above-described achieving means. That is, the nose-dive-direction pitching may be generated at the vehicle body 1a by executing only the first vehicle attitude control to increase the torque applied to the rear wheels 2b by means of the electromagnetic coupling 5e when the steering wheel 6 is turned, without executing the second vehicle attitude control to decrease the torque of the engine 4 for the vehicle deceleration.

Figure 14:
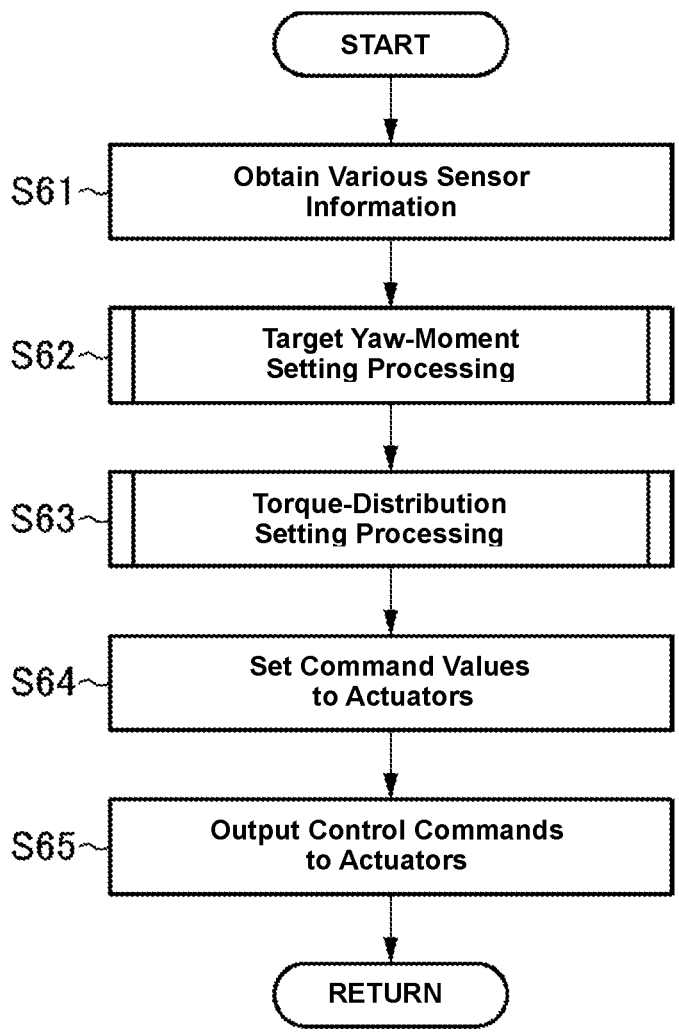
FIG. 14 is a flowchart showing a total control according to a modified example of the embodiment of the present disclosure.

This modified example is achieved by a control of a flow chart shown in FIG. 14. FIG. 14 is the flowchart showing a total control according to this modified example of the embodiment of the present disclosure. Steps S61, S62, S63, S64 and S65 of FIG. 14 are similar to the steps S11, S13, S14, S17 and S18 of FIG. 5, respectively. That is, the total control of this modified example is different from the total control of FIG. 5 in having no steps corresponding to the step S12 to execute the decrease-torque setting processing, the step S15 to determine whether or not the torque of the engine 4 is the specified value or larger and the decrease torque exists, and the step S16 to restrict the changing of the torque distribution ratio.

Figure 15:
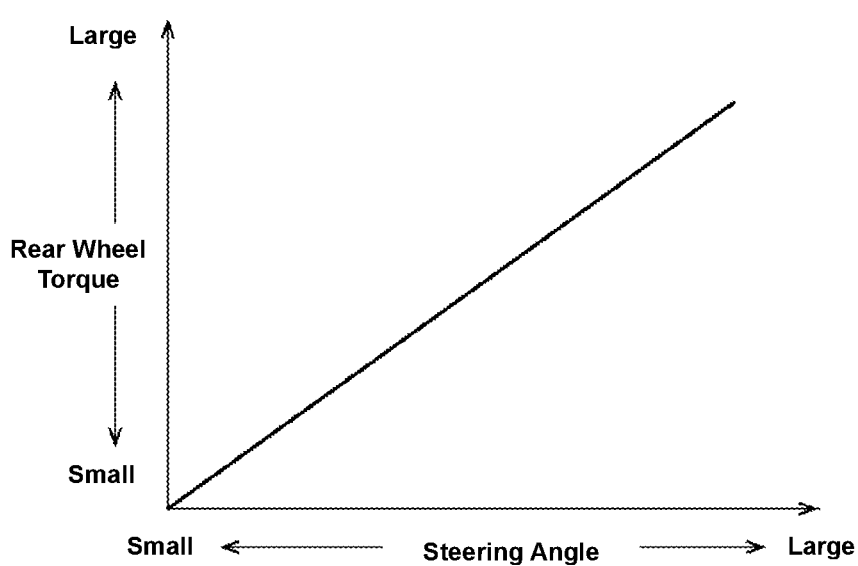
FIG. 15 is a map for setting the distribution torque of the rear wheel in accordance with a steering angle according to another modified example of the embodiment of the present disclosure.

FIG. 15 is a map for setting the distribution torque of the rear wheel in accordance with a steering angle according to another modified example of the embodiment of the present disclosure. According to the total control of this modified example, the various controls are performed based on results of the torque-distribution setting processing of the step S63 mainly, without executing the decrease-torque setting processing, that is—without adopting the decrease torque.

As shown in the above-described modified example, the nose-dive-direction pitching can be properly generated at the vehicle body 1a when the steering wheel 6 is turned by executing the first vehicle attitude control only, not executing the second vehicle attitude control.

Modified Example 2

In the above-described modified example, increasing or decreasing of the torque applied to the rear wheels 2b when the steering wheel 6 is turned or returned is achieved by setting the final distribution ratio applied to the rear wheels 2b with the first gain and the second gain (see FIGS. 11A and 11B) which are set based on the target yaw rate and the target lateral acceleration corresponding to the steering angle (see FIGS. 10A-10F) by the torque-distribution setting processing of FIG. 9. However, increasing or decreasing of the torque applied to the rear wheels 2b may be achieved according to the magnitude of the steering angle simply.

FIG. 15 is a map for providing the torque (vertical axis) applied to the rear wheels 2b which is to be set according to the steering angle (lateral axis) in this modified example of the embodiment of the present disclosure. The map of FIG. 15 is provided such that the torque (corresponding to the final distribution torque) distributed to the rear wheels 2b becomes larger as the steering angle becomes larger. According to this map, when the steering wheel 6 is turned, the torque applied to the rear wheels 2 increases because the steering angle becomes larger. Thereby, the control to increase the torque applied to the rear wheels 2b for generating the nose-dive-direction pitching at the vehicle body 1a (the first vehicle attitude control) is properly achieved when the steering wheel 6 is turned. Meanwhile, when the steering wheel 6 is returned, the torque applied to the rear wheels 2b decreases because the steering angle becomes smaller. Thereby, when the steering wheel 6 is returned, the control to decrease the torque applied to the rear wheels 2b for generating the rearward-tilt-direction pitching at the vehicle body 1a (the third vehicle attitude control) is properly achieved.

Herein, while the relationship between the steering angle and the torque applied to the rear wheels 2b is linear in the map of FIG. 15, a map of an nonlinear (e.g., quadratic function) relationship between the steering angle and the torque applied to the rear wheels 2b may be applied as long as the torque applied to the rear wheels 2b becomes larger as the steering angle becomes larger.

Modified Example 3

While the above-described embodiment exemplifies a case where the present disclosure is applied to the FF (front-engine front-drive) type based four-wheel drive vehicle, the present disclosure is applicable to any four-wheel drive vehicle which has various kinds of drive type (e.g., front-engine front-drive (FR) type). That, the present disclosure is not limited to application to the four-wheel drive vehicle in which the front wheels 2a are the driving wheels and the rear wheels 2b are the auxiliary driving wheels, but is applicable to a four-wheel drive vehicle in which the rear wheels 2b are the driving wheels and the front wheels 2a are the auxiliary driving wheels.

Modified Example 4

While the above-described embodiment exemplifies a case where the present disclosure is applied to the vehicle 1 with the engine 4 as the power source, the present disclosure is applicable to a vehicle with any power source than the engine 4. For example, the present disclosure is applicable to the vehicle with a motor (electric motor).

Modified Example 5

While the vehicle attitude control is executed based on the steering angle and the steering speed in the above-described embodiment, any other control parameter, such as the yaw rate, the lateral acceleration, or the lateral jerk, may be used instead of the steering angle and the steering speed.

Modified Example 6

While the above-described embodiment exemplifies a case where the electromagnetic coupling 5e is used as the torque distributing mechanism to distribute the torque of the engine 4 to the front wheels 2a and the rear wheels 2b, the torque distributing mechanism is not limited to the electromagnetic coupling 5e but any other known mechanism is usable as this torque distributing mechanism.

What is claimed is:

1. A vehicle system, comprising:
a power source configured to drive a vehicle;
a front wheel and a rear wheel;
a torque distributing mechanism configured to distribute a torque of the power source to the front wheel and the rear wheel;
a steering wheel to be operated by a driver;
a brake provided at each of the front wheel and the rear wheel;
a steering angle sensor configured to detect a steering angle which corresponds to operation of the steering wheel; and
a controller configured to control the power source and the torque distributing mechanism, such that the torque distributed to the rear wheel is decreased in accordance with a returning operation of the steering wheel which is detected by the steering angle sensor;
wherein the controller is configured to control the brake which is provided at a turning outer wheel such that a yaw moment which has an opposite direction to a yaw rate generated at the vehicle is applied to the vehicle when the returning operation of the steering wheel is conducted.

2. The vehicle system of claim 1, wherein the controller is configured to suppress operation of the torque distributing mechanism for changing the torque distributed to the rear wheel in a steady turning state of the vehicle before the returning operation of the steering wheel.

3. The vehicle system of claim 1, further comprising:
a suspension provided with an attachment portion where the suspension is attached to a vehicle body, the attachment portion being located at a higher level than a center axis of the rear wheel.

4. The vehicle system of claim 1, wherein
the torque distributed to the rear wheel being decreased generates a rearward-tilt-direction pitching of the vehicle.

5. The vehicle system of claim 4, wherein
the torque distributed to the rear wheel is decreased such that an angle of the rearward-tilt-direction pitching of the vehicle decreases in accordance with a decrease in the steering angle.

6. The vehicle system of claim 1, wherein
the torque distributed to the rear wheel is decreased in linear proportion with a decrease in the steering angle.

7. The vehicle system of claim 1, wherein
the torque distributed to the rear wheel is decreased in non-linear proportion with a decrease in the steering angle.

8. The vehicle system of claim 1, wherein
the torque distributing mechanism includes an electromagnetic coupling device configured to distribute the torque of the power source to the front wheel and the rear wheel.

9. A vehicle system, comprising:
a power source configured to drive a vehicle;
a front wheel and a rear wheel;
a torque distributing mechanism configured to distribute a torque of the power source to the front wheel and the rear wheel;
a steering wheel to be operated by a driver;
a steering angle sensor configured to detect a steering angle which corresponds to operation of the steering wheel; and
a controller configured to control the power source and the torque distributing mechanism, such that the torque distributed to the rear wheel is decreased in accordance with a returning operation of the steering wheel which is detected by the steering angle sensor;
wherein the torque distributed to the rear wheel being decreased generates a rearward-tilt-direction pitching of the vehicle.

10. The vehicle system of claim 9, wherein the controller is configured to suppress operation of the torque distributing mechanism for changing the torque distributed to the rear wheel in a steady turning state of the vehicle before the returning operation of the steering wheel.

11. The vehicle system of claim 9, further comprising:
a suspension provided with an attachment portion where the suspension is attached to a vehicle body, the attachment portion being located at a higher level than a center axis of the rear wheel.

12. The vehicle system of claim 9, wherein
the torque distributed to the rear wheel is decreased such that an angle of the rearward-tilt-direction pitching of the vehicle decreases in accordance with a decrease in the steering angle.

13. The vehicle system of claim 9, wherein
the torque distributed to the rear wheel is decreased in linear proportion with a decrease in the steering angle.

14. The vehicle system of claim 9, wherein
the torque distributed to the rear wheel is decreased in non-linear proportion with a decrease in the steering angle.

15. The vehicle system of claim 9, wherein
the torque distributing mechanism includes an electromagnetic coupling device configured to distribute the torque of the power source to the front wheel and the rear wheel.

* * * * *